United States Patent
Santo et al.

(10) Patent No.: US 9,127,118 B2
(45) Date of Patent: Sep. 8, 2015

(54) RESIN FOR TONER, TONER USING THE RESIN, AND DEVELOPMENT AGENT USING THE TONER

(75) Inventors: Hideyuki Santo, Shizuoka (JP); Shinya Nakayama, Shizuoka (JP); Atsushi Yamamoto, Shizuoka (JP); Yoshihiro Moriya, Shizuoka (JP); Akiyoshi Sabu, Shizuoka (JP); Daisuke Asahina, Shizuoka (JP); Yoshitaka Yamauchi, Shizuoka (JP); Taichi Nemoto, Shizuoka (JP); Yukiko Nakajima, Shizuoka (JP); Daiki Yamashita, Kanagawa (JP); Masahide Yamada, Shizuoka (JP); Keiji Makabe, Shizuoka (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 13/413,980

(22) Filed: Mar. 7, 2012

(65) Prior Publication Data

US 2012/0231383 A1 Sep. 13, 2012

(30) Foreign Application Priority Data

| Mar. 10, 2011 | (JP) | 2011-052726 |
| Apr. 4, 2011 | (JP) | 2011-082684 |
| Apr. 12, 2011 | (JP) | 2011-088481 |
| May 12, 2011 | (JP) | 2011-107298 |

(51) Int. Cl.
G03G 9/087 (2006.01)
C08G 63/08 (2006.01)

(52) U.S. Cl.
CPC ............ *C08G 63/08* (2013.01); *G03G 9/08755* (2013.01); *G03G 9/08757* (2013.01); *G03G 9/08764* (2013.01); *G03G 9/08791* (2013.01); *G03G 9/08797* (2013.01)

(58) Field of Classification Search
CPC .............. C08G 63/08; C03G 9/08755; C03G 9/08791; C03G 9/08764
USPC .......... 528/354, 60, 62, 96; 430/109.4, 109.5, 430/109.2
See application file for complete search history.

(56) References Cited

U.S. PATENT DOCUMENTS

| 5,932,539 A * | 8/1999 | Stupp et al. .................... 527/207 |
| 8,652,723 B2 * | 2/2014 | Faucher et al. ............. 430/108.4 |
| 2009/0003885 A1 * | 1/2009 | Sabu et al. .................... 399/252 |
| 2010/0216068 A1 | 8/2010 | Kotsugai et al. |
| 2010/0330489 A1 | 12/2010 | Inoue et al. |
| 2011/0129775 A1 | 6/2011 | Sawada et al. |
| 2012/0065357 A1 * | 3/2012 | Yamauchi et al. ............. 528/302 |

FOREIGN PATENT DOCUMENTS

| JP | 8-302003 | 11/1996 |
| JP | 8-305081 | 11/1996 |

(Continued)

OTHER PUBLICATIONS

Grant, R. et al., ed., Grant & Hackh's Chemical Dictionary, fifth edition, McGraw-Hill Book Company, NY (1987), pp. 114, 115, and 328.*

(Continued)

*Primary Examiner* — Janis L Dote
(74) *Attorney, Agent, or Firm* — Cooper & Dunham LLP

(57) ABSTRACT

A resin for toner contains a polyhydroxycarboxylic acid skeleton and a rigid skeleton.

14 Claims, 5 Drawing Sheets

STRUCTURE OF RESIN A-1 TO A-7

STRUCTURE OF RESIN A-8 AND A-12

STRUCTURE OF RESIN A-11

STRUCTURE OF RESIN A-9

STRUCTURE OF RESIN A-10

(56) References Cited

FOREIGN PATENT DOCUMENTS

| | | |
|---|---|---|
| JP | 11-327209 | 11/1999 |
| JP | 2001-117268 | 4/2001 |
| JP | 2002-30208 | 1/2002 |
| JP | 2005-84383 | 3/2005 |
| JP | 2006-91278 | 4/2006 |
| JP | 2006-285150 | 10/2006 |
| JP | 2007-112849 | 5/2007 |
| JP | 2008-145568 | 6/2008 |
| JP | 2008-262179 | 10/2008 |
| JP | 2010-14757 | 1/2010 |
| JP | 2010-49070 | 3/2010 |
| JP | 2010-60847 | 3/2010 |
| JP | 2010-66491 | 3/2010 |
| JP | 2010-122667 | 6/2010 |
| JP | 2011-48176 | 3/2011 |
| JP | 2012-63381 | 3/2012 |

OTHER PUBLICATIONS

USPTO Trademark Electronic Search Sytem (TESS) printout of Jul. 1, 2014, describing the Trademark Henschel Mixers, Serial No. 77882874.*
American Chemical Society (ACS) File Registry Number No. 1189164-60-0 on STN, copyright 2014, which was entered in STN on Oct. 20, 2009.*
USPTO Trademark Electronic Search Sytem (TESS) printout of Nov. 20, 2014, describing the Trademark Henschel Mixer, Serial No. 75599986.*
USPTO Trademark Electronic Search Sytem (TESS) printout of Nov. 20, 2014 describing the Trademark Claytone, Serial No. 73062359.*
USPTO Trademark Electronic Search Sytem (TESS) printout of Nov. 20, 2014 describing the Trademark Tixogel, Serial No. 73328003.*
Japanese official action dated Jan. 15, 2015 in corresponding Japanese patent application No. 2011-082684.
Japanese official action dated Oct. 15, 2014 in corresponding Japanese patent application No. 2011-052726.

* cited by examiner

STRUCTURE OF RESIN A-1 TO A-7

STRUCTURE OF RESIN A-8 AND A-12

STRUCTURE OF RESIN A-11

STRUCTURE OF RESIN A-9

STRUCTURE OF RESIN A-10

RESIN FOR TONER, TONER USING THE RESIN, AND DEVELOPMENT AGENT USING THE TONER

CROSS-REFERENCE TO RELATED APPLICATIONS

This patent application is based on and claims priority pursuant to 35 U.S.C. §119 to Japanese Patent Applications Nos. 2011-052726, 2011-082684, 2011-088481, and 2011-107298, filed on Mar. 10, 2011, Apr. 4, 2011, Apr. 12, 2011, and May 12, 2011, respectively, in the Japanese Patent Office, the entire disclosures of which are hereby incorporated by reference herein.

BACKGROUND OF THE INVENTION

1. Field of the Invention

The present invention relates to a resin for toner, toner using the resin, and development agent using the toner.

2. Description of the Background Art

Binder resins account for 70% or more of conventional toner, and most of the binder resins derive from petroleum. This creates concerns about depletion of oil reserves and global warming caused by emission of carbon dioxide into the air resulting from mass consumption of oil.

Accordingly, toner made of resins such as poly-lactates deriving from plants has been proposed to deal with such concerns, because plants grow by taking in carbon dioxide from the atmosphere, thereby solving both problems of global warming and oil depletion.

However, poly-lactate is highly crystalline if it contains only L-lactate or D-lactate. Such poly-lactate is extremely insoluble in organic solvents, which makes it difficult to use toner manufacturing methods such as dissolution resin suspension methods.

Japanese patent application publication no. 2008-262179 (JP-2008-262179-A) describes a method of improving the solubility of poly-lactate in organic solvents by mixing L-lactate and D-lactate to decrease the crystallinity of the poly-lactate.

However, the glass transition temperature of poly-lactate is 60° C. or lower, and using poly-lactate singly further lowers the glass transition temperature and the heat distortion temperature due to moisture absorption. Therefore, if such poly-lactate is transported or preserved under high-temperature and high-humidity conditions, particles or formed images conglutinate to an impermissible level.

Therefore, modification of poly-lactate is required to use it as a binder resin for toner. With regard to this point, JP-H08-302003-A describes manufacturing of copolymerized poly-lactates by reacting a reactant of an aromatic dicarboxylic acid and an aliphatic diol with lactic acid. However, since the glass transition temperature of the thus-obtained poly-lactate is still 60° C. or lower, it remains difficult to transport or preserve toner formed of poly-lactate under high-temperature and high-humidity conditions.

In addition, JP-2007-112849-A describes a method of synthesizing a copolymerized poly-lactate into which a fluorene skeleton is introduced to raise the glass transition temperature to 60° C. or higher. However, since fluorene tends to be fluorescent under irradiation by ultraviolet light, it is not suitable as a resin for toner.

Furthermore, JP-H11-327209-A describes a method of developing toner having excellent heat resistance while keeping a good low temperature fixing property by having a branch skeleton in the polymer chain. However, this is not applied to poly-lactates but to polymers formed of styrene-based monomers and acrylic-based monomers.

SUMMARY OF THE INVENTION

In view of the foregoing, the present invention provides a resin for toner containing a polyhydroxycarboxylic acid skeleton and a rigid skeleton.

It is preferred that, in the resin for toner mentioned above, the rigid skeleton has a heterocyclic or polycyclic skeleton.

As another aspect of the present invention, a resin for toner containing a polyhydroxycarboxylic acid skeleton represented by the following chemical formula 1: X—(Y—Z)n chemical formula 1, where X and Z independently represent rigid skeletons having a planar structure, Y represents a polyhydroxycarboxylic acid structure, and n represents an integer of 2 or greater, wherein the resin is soluble in an organic solvent.

It is preferred that, in the resin for toner mentioned above, the resin has a glass transition temperature of 50° C. or higher and a softening point of 120° C. or lower as measured by a ½ method using a flow tester.

It is still further preferred that, in the resin for toner mentioned above, X in chemical formula 1 contains a skeleton having an aromatic or heterocyclic ring.

It is still further preferred that, in the resin for toner mentioned above, X in chemical formula 1 contains an isocyanurate skeleton.

It is still further preferred that, in the resin for toner mentioned above, Y in chemical formula 1 contains a urethane bonding.

It is still further preferred that the resin for toner mentioned above has a static contact angle of from 70° to 80°.

It is still further preferred that the resin for toner mentioned above has a glass transition temperature of 57° C. or higher and a thermal distortion temperature of 53° C. or higher in a compression test at 90% RH.

It is still further preferred that, in the resin for toner mentioned above, Z in chemical formula 1 contains a cyclic compound having a fluorine atom at an end thereof.

It is still further preferred that, in the resin for toner mentioned above, one of X and Z in chemical formula 1 contains a polar functional group.

It is still further preferred that, in the resin for toner mentioned above, the polar functional group is an acid polar functional group.

It is still further preferred that, in the resin for toner mentioned above, the polyhydroxycarboxylic acid skeleton is formed by polymerizing hydroxycarboxylic acids having two or three carbon atoms.

It is still further preferred that, in the resin for toner mentioned above, the polyhydroxycarboxylic acid skeleton has a polyhydroxycarboxylic acid skeleton comprises an optically active monomer, wherein an optical purity X (%)=|X(L-)–X(D-)| is 80% or less in the optically-active monomer component conversion, where X (L-) represents the proportion of L- and X (D-) represents the proportion of D- in the optically-active monomer component conversion.

It is still further preferred that, in the resin for toner mentioned above, the polyhydroxycarboxylic acid skeleton has a number average molecular weight Mn of from 1,000 to 20,000.

As another aspect of the present invention, a toner is provided which contains the resin for toner mentioned above.

As another aspect of the present invention, a development agent is provided which contains the toner mentioned above and a carrier.

BRIEF DESCRIPTION OF THE DRAWINGS

Various other objects, features, and attendant advantages of the present invention will be more fully appreciated as the same becomes better understood from the detailed description when considered in connection with the accompanying drawings, in which like reference characters designate like corresponding parts throughout and wherein.

DETAILED DESCRIPTION OF THE INVENTION

Figure 1:
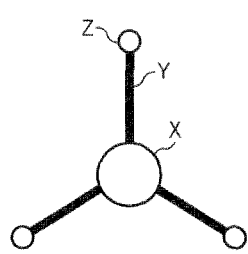
FIG. 1 is a diagram illustrating the structures of the resins for use in later-described Examples.
Figure 1:
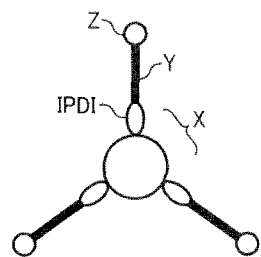
Figure 1:
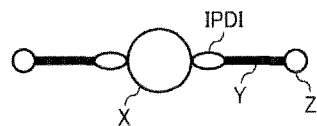
Figure 1:
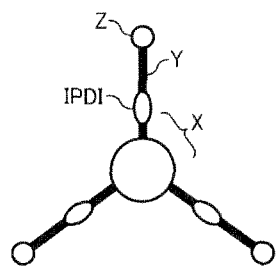
Figure 1:
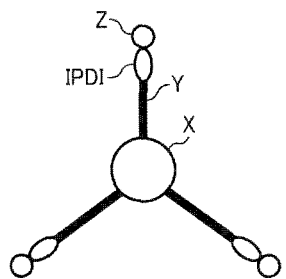

The present disclosure will be described below in detail with reference to embodiments and accompanying drawings.

The resin for toner of the present disclosure has a polyhydroxycarboxylic acid skeleton soluble in organic solvents and a rigid skeleton and is preferably represented by the following structure 1. By this structure, the property such as glass transition temperature of the resin can be controlled.

$$X-(Y-Z)_n \qquad \text{Chemical formula 1}$$

In the chemical formula 1, X and Z represent rigid skeletons having a planar structure and Y represents a polyhydroxycarboxylic acid skeleton. A symbol "n" represents an integer of 2 or greater.

The resin for toner of the present disclosure preferably has a glass transition temperature of 50° C. or higher and a softening point of 120° C. or lower as measured by a ½ method using a flow tester. The resin preferably has a glass transition temperature of 50° C. or higher in terms of keeping a high temperature preservation property of toner when the resin is contained in toner. In addition, the resin preferably has a softening point of 120° C. or lower in terms of securing a good low temperature fixing property.

The polyhydroxycarboxylic acid skeleton has a skeleton in which hydroxycarboxylic acid is (co)polymerized and is formed by a method of directly conducting dehydration condensation reaction of a hydroxycarboxylic acid or a method of ring-opening polymerizing a corresponding cyclic ester. With regard to the polymerization methods, the ring-opening polymerization of a cyclic ester is more preferable in terms of increasing the molecular weight of the polymerized polyhydroxycarboxylic acid. Furthermore, resins formed by using polyalcohol as an initiator in the polymerization reaction improve the affinity with a coloring agent.

In terms of transparency and thermal characteristics of the toner, monomers forming the polyhydroxycarboxylic acid skeleton are preferably aliphatic hydroxycarboxylic acids and more preferably hydroxycarboxylic acid having 2 to 6 carbon atoms. Specific examples thereof include, but are not limited to, lactic acid and glycolic acid. Among these, lactic acid is particularly preferable considering the glass transition temperature, the transparency of the resin, and the affinity with a coloring agent of lactic acid.

It is also possible to use cyclic esters of hydroxycarboxylic acid other than hydroxycarboxylic acid as the raw material for the polymer. In such a case, the hydroxycarboxylic acid skeleton of the resin obtained by polymerization has a skeleton in which hydroxycarboxylic acid forming a cyclic ester is polymerized. For example, in the polyhydroxycarboxylic acid skeleton of the resin obtained by using lactide, lactic acid is polymerized.

Any precursor of X in the Chemical formula 1 can be suitably used if the precursor has a branch-type polyfunctional group and is a molecule having a rigid skeleton with a planar structure. In particular, aromatic compounds and heterocyclic compounds are preferable. Among these, the heterocyclic compounds are more preferable. When X has a planar structure, the planar structure works as the rigid portion, which is thought to improve the heat resistance.

The precursor of S means a compound before reaction with Y or the linking component described later. In addition, the branch-type polyfunctional groups in the precursor of X mean having two or more functional groups reactive with Y or the linking component described later.

Specific examples of the molecules having a planar structure used as the precursor of X include, but are not limited to, in the case of bi-functional groups, diol compounds such as bis(2-hydroxyethyl)terephthalate (BHET) and bis(2-hydroxypropyl)terephthalate (BHPT) and, in the case of tri-functional groups, any molecule having functional groups such as an isocyanate group and an epoxy group reactive with polyhydroxycarboxylic acid skeleton (Y). Among these, the isocyanurate skeleton represented by the following chemical structure is preferable in light of improving the heat resistance.

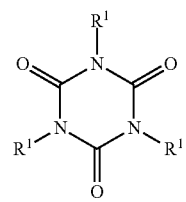

Chemical structure 1

In the Chemical structure 1, $R^1$ has a functional group reactive with Y or the linking portion described later and an alkyl chain having eight or less carbon atoms.

Specific examples of polyhydroxycarboxylic acid skeleton represented by Y in the Chemical formula 1 include any known resins such as polyglycolic acids, poly lactic acids, polyhydroxy butylic acid, polymalic acid, and poly ε capro-lactone. Among these, poly-lactic acid-base skeletons are preferable because they are plant-deriving resins. Polylacitic acids are formed by ester-bonding of lactic acids and notable nowadays as a biodegradable plastic, which is gentle to the global environment. That is, since enzymes (esterase) that sever ester bondings are widely present in the natural world, poly-lactates are slowly decomposed by such enzymes in the environments and converted into lactic acid, i.e. monomer, which finally becomes carbon dioxide and water.

In addition, Y in the Chemical formula 1 preferably has a urethane bonding in terms of high temperature preservation property and charging environment stability and the urethane bonding is preferably positioned at the inside of the end of the polyhydroxycarboxylic acid skeleton.

In addition, the urethane bonding is more preferably positioned closer to the center of the polyhydroxycarboxylic acid skeleton. This increases intermolecular urethane mutual interaction, which is thought to contribute to improvement of the heat resistance.

In the poly-lactate resin components, the optical purity X (%) in monomer composition conversion is 80% or less and preferably 60% or less.

$$X(\%)=|X(L\text{-})-X(D\text{-})|\qquad\text{Relationship 1}$$

In the relationship 1, X (L-) represents L-poly-lactate proportion (%) in lactic acid monomer conversion and X (D-) represents D-poly-lactate proportion (%) in lactic acid monomer conversion.

There is no specific limit to the measuring method of the optical purity described above. For example, the optical purity can be obtained as follows: Add a polymer or toner having a polyester skeleton to a liquid mixture of deionized water, 1N sodium hydroxide, and isopropyl alcohol followed by heating and stirring at 70° C. for hydrolysis; Next, filtrate the resultant to remove the solid portion in the liquid followed by neutralization by adding sulfuric acid to obtain aqueous solution that contains L- and/or D-lactic acid decomposed from the polyester resins; and Measure the aqueous solution by a high-performance liquid chromatgraph (HPLC) using a chiral ligand exchange type column (SUMICHIRAL OA-5000, manufactured by Sumika Chemical Analysis Service, Ltd.) to calculate the peak area S (L) deriving from L-lactic acid and the peak area S (D) deriving from D-lactic acid. The optical purity X is obtained from the peak areas as follows:

$$X(L\text{-})(\%)=100\times S(L)/\{S(L)+S(D)\}$$

$$X(D\text{-})(\%)=100\times S(D)/\{S(L)+S(D)\}$$

$$\text{Optical purity }X(\%)=|X(L\text{-})-X(D\text{-})|$$

L- and D- used in raw materials are optical isomers, which naturally have the same physical and chemical natures except for the optical property. Therefore, the reaction properties of both are the same when used in polymerization so that the composition ratio in the monomer and the monomer composition ratio in the polymer are the same.

An optical purity of 80% or less is preferable to improve the solubility and the transparency of the resin.

The ratio of X (D-) and X (L-) in the monomer forming the hydroxycarboxylic acid skeleton is equal to that in the monomer for use in forming the hydroxycarboxylic acid skeleton. Therefore, to control the optical purity X (%) of the hydroxycarboxylic acid skeleton of the resin for toner in monomer component conversion, it is suitable to obtain racemic forms by using both L- and D-monomers in reasonable amounts.

The number average molecular weight Mn of the polyhydroxycarboxylic acid skeleton represented by Y in the Chemical formula 1 is preferably from 1,000 to 20,000. When the number average molecular weight Mn is small, the softening point of the resin tends to become low so that the resin smoothly dissolves in a solvent at a low temperature. When the number average molecular weight Mn is large, since the ratio of the polyhydroxycarboxylic acid unit in the resin for toner increases, the attachability of the resin to paper is improved.

There is no specific limit to the manufacturing method of poly-lactic acid resin and known methods are suitably used.

Among the known methods, for example, poly-lactic acid resins can be synthesized by fermenting starch of corns serving as raw materials to obtain lactic acid followed by direct hydration condensation of lactic acid monomers or conducting ring-opening polymerization under the presence of a catalyst via from lactic acid to cyclic dimer lactide. Among these, the ring-opening polymerization method is preferable in terms of productivity, e.g., controlling the molecular weight by the amount of an initiator and short reaction time.

Known initiators having alcohol components that do not volatile under the condition of drying at 100° C. with a reduced pressure of 20 mmHg or less or polymerization heating at around 200° C. can be used as the reaction initiator irrespective of the number of functional groups.

It is possible to use a method in which after the poly-lactic acid resin skeleton Y is introduced using a precursor of the component Z described later as the initiator, the resultant is reacted with the precursor of the component X or a method in which after the poly-lactic acid resin skeleton Y is introduced using a precursor of the component X as the initiator, the resultant is reacted with the precursor of the component Z. Alternatively, a method is suitable in which after synthesizing poly-lactic acid containing the component Z, the resultant is reacted with poly-lactic acid containing the component X via a linking component.

Isocyanate compounds, gylcidyl compounds, acid anhydride compounds, and acid chloride compounds can be used as the linking components. Specific preferred examples thereof include, but are not limited to, diisocyanates such as tolylene diisocyanate, tolidine diisocyanate, xylylene diisocyanate, dihpenylmethane diisocyanate, naphthylene diisocyanate, isophorone diisocyanate, lysine diisocyanate, hexamethylene diisocyanate, and methylenebis cyclohexyl diisocyanate, digylcidyl ethers such as resorcinol digylcidyl ether, neopentyl glycol digylcidyl ether, hexane diol digylcidyl ether, hydrogenated bisphenol A digylcidyl ether, diglycidyl terephthalate, diglycidy isophthalate, ethylene glycol digylcidyl ether, diethylene glycol digylcidyl ether, polyethylene glycol digylcidyl ether, and polypropylene glycol digylcidyl ether, acid anhydrides such as anhydrides of naphthalene tetracarbonate, anhydrides of dioxotetrahydro furanyl methyl cyclohexane dicarbonate, anhydrides of pyromellitic acid, anhydrides of oxydiphthalate, anhydrides of biphenyltetracarbonate, anhydrides of benzophenone tetra carbonate, anhydrides of diphenyl supfone tetra carbonate, anhydrides of tetrafluoro isopropylidene diphthalate, anhydrides of terphenyl tetracarbonate, anhydrides of cyclobutane tetracarbonate, and anhydrides of carboxymethyl cyclopentane tricarbonate, and aliphatic carbonates such as oxalic acid, maronic acid, succinic acid, glutaric acid, adipic acid, pimelic acid, suberic acid, azelaic acid, sebacic acid, cyclohexane dicarbonate and acid chlorides thereof. When the linking component is an isocyanate compound, isocyanate group forms urethane bonding by reacting with polyhydroxycarboxylic acid skeleton (Y), which is preferable. Among these, diisocyanate is particularly preferable because it is highly reactive and easy to handle. Furthermore, aromatic diisocyanate is most preferable because it is highly active and keeps the glass transition temperature from decreasing. Among these, isophorone diisocyanate (IPDI) is preferable in terms of reactivity and safety.

Any precursor of X in the Chemical formula 1 which has a molecule having a polyfunctional group and a rigid skeleton with a planar structure can be used. Among these, polycyclic skeletons having multiple cyclic structures and structures having an aromatic ring are preferable. The precursor of Z means compounds before reaction with Y or the linking component. In addition, the precursor of Z being mono-functional means that it has only a single functional group reactive with Y or the linking component.

Specific examples of such skeletons include, but are not limited to, the following: Specific examples of the polycyclic skeletons include, but are not limited to, polycyclic aromatic heteroring compounds such as quinoline, benzofuran, and acridine, dehydro abietine acid skeletons, and steroid skeletons. In addition to those, polycyclic aromatic compounds such as naphthalene and anthracene can be specified. Among these, cholesterol, which is one kind of steroid compounds, is preferable considering it is a natural product. The steroid ring is a carbon ring first alcohol the basic structure of which is perhydrocyclopentanone phenanthrene nuclear and derivatives thereof and includes cholesterol, bile acid, and steroid hormone. Any steroid compound that has a hydroxyl group at its end can be suitably used.

To accelerate various polymerization reactions, esterification catalysts and urethanication catalysts such as amine compounds, tin compounds, titan compounds can be suitably used. However, the urethanication catalysts may work as decomposition catalysts in the resin. Therefore, it is preferable to avoid using the urethanication catalysts or reduce the amount thereof.

Furthermore, additives such as known heat stabilizers, antioxidants, ultraviolet absorbents, flame retardants, non-reactive hydrolysis inhibitors, light resistance improvers, waxes, lubricants, charge control agents, organic plasticizers, biodegradable thermoplastic resins, coloring agents, and flatting agent can be optionally added during and/or after the resin polymerization process.

The resin for toner in the present disclosure preferably has a static contact angle of 70° C. to 80° C. to water. The static contact angle means the angle formed between the surface of static liquid and the solid wall at the contact point thereof and is an index of wettability of liquid to a solid. Therefore, a moderate affinity is provided to the resin on the whole while blocking the end thereof by placing a rigid skeleton having a hydrophobic group at all the ends of the resin to secure the high temperature preservation property and the hydrolysis decomposition resistance property and improve the attachability to recording media, typically paper mainly formed of cellulose, and ameliorate the low temperature fixing property together with the fixing altitude. The static contact angle to water can be controlled to be within the range of from 70° to 80° by, for example, adjusting the kind and the molecular weight of the polyhydroxycarboxylic acid skeleton of Y in the Chemical formula 1 or introducing a polar functional group into the skeleton having a planar structure of X in the Chemical formula 1. The static contact angle can be obtained by, for example, dissolving the resin for toner in an organic solvent and uniformly applying the resultant to a slide glass with a wire bar for measuring by θ/2 method after the organic solvent is sufficiently vaporized.

The rigid skeleton having a hydrophobic group at the end of Z in the Chemical formula 1 preferably has a hydroxy group in terms of using it as a reaction initiator to synthesize the polyhydroxy carboxylic acid skeleton. In addition, cyclic compounds are preferable in light of the high temperature preservation property and the hydrolysis decomposition resistance and cyclic compounds having a fluorine at the end are more preferable in terms of the wettablity of toner during fixing.

Specific examples of such cyclic compounds include, but are not limited to, monocyclic compounds such as phenol and cresol, polycyclic aromatic compounds such as naphthalene, anthracene, and fluorene, polycyclic aromatic heterocyclic compounds such as quinoline, benzofuran, and acridine, and compounds having a steroid skeleton.

Specific examples of the cyclic compounds having a fluorine at the end include, but are not limited to, 4-fluorophenol and 2,3,4,5-tetrafluorobenzil alcohol.

The resin for toner preferably has a distortion temperature of 53° C. or higher in the compression test in a 90% RH environment. When the glass transition temperature is higher than 57° C. but the distortion temperature is lower than 53° C. in a 90% RH environment, conglutination among particles and of formed images may occur when the toner is preserved for a long time in summer or transported by sea or land or produced toner images are preserved, which leads to significant defects in the quality of products.

Therefore, the resin for toner preferably has a glass transition temperature of 57° C. or higher and a distortion temperature of 53° C. or higher in the compression test in a 90% RH environment.

When the glass transition temperature is higher than 57° C. but the distortion temperature is lower than 53° C. in a 90% RH environment, conglutination among particles and of formed images may occur when the toner is preserved for a long time in summer or transported by sea or land or produced toner images are preserved, which leads to significant defects in the quality of the products.

The resin for toner preferably includes a functional group having polarity (polar group) in at least X and Z. The polar group is dissociable and forms a salt in an aqueous solvent. By introducing a polar group, the attachability to paper (recording medium) and the low temperature fixing property are improved. In addition, since the resin having a polar group has a good affinity with a pigment, the dispersion property of the pigment is improved, thereby improving the color reproducibility of the toner containing the resin.

Specific examples of the polar groups include, but are not limited to, carboxyl groups, sulfo groups, salts thereof, halogen groups, cyano groups, amide groups, and ester groups. Among these, the polar group is preferably acidic in terms of chargeability and carboxyl groups, sulfo groups, and salts thereof are particularly preferable in terms of the low temperature fixing property.

The resin for toner has preferably a number average molecular weight of 5,000 or higher. When the number average molecular weight Mn is too small, the preservability of toner tends to deteriorate, causing blocking of toner during preservation and in the development device. Moreover, the upper limit of the fixing temperature tends to become low, which may narrow the fixing range.

Method of Manufacturing Toner

Next, the method of manufacturing toner is described.

The toner is preferably made by using known methods such as dry manufacturing methods such as mixing and kneading pulverization methods and wet manufacturing methods such as agglomeration methods.

Since poly-lactic acid is a hard resin, thereby requiring a large energy for pulverization, using the wet manufacturing method is preferable.

With regard to the toner manufacturing methods, the mixing, kneading, and pulverization method, the emulsification agglomeration method, the dissolution suspension method, the dissolution emulsification method, the suspension granulation method, the suspension polymerization method, and the ester elongation method are described in detail.

Mixing, Kneading, and Pulverization Method

The mixing, kneading, and pulverization method includes a step 1 of the pre-mixing process, a step 2 of the melting, mixing, and kneading process, a step 3 of the pulverization process, and a step 4 of the classification process.

Each of steps 1 to 4 is described in detail.

Pre-Mixing Process

In the step 1 of the pre-mixing process, a mixture is prepared by dry-mixing at least a binder resin, a coloring agent, and hydrophobic particulates by a mixer. The mixture optionally contains toner additives in addition to the binder resin, the coloring agent, and the hydrophobic particulates. Specific examples of the toner additives include, but are not limited to, releasing agents (wax) and charge control agents.

Specific examples of the mixers for use in dry-mixing include, but are not limited to, Henschel type mixers such as Henschel mixers (FM MIXER, manufactured by Nippon Coke & Engineering Co., Ltd.), Super mixers (manufactured by Kawata Mfg. Co., Ltd.), Mechanomil (manufactured by Okada Seiko Co., Ltd.), Ongmil (manufactured by Hosokawa Micron Group), Hybridization system (manufactured by Nara Machinery Co., Ltd.), and Cosmo System (manufactured by Kawasaki Heavy Industries, Ltd.).

Melting and Mixing and Kneading Process

In the step 2 of melting and mixing and kneading process, the mixture prepared in the pre-mixing process is melted and mixed and kneaded to manufacture a melted and mixed and kneaded product. The mixture is melted and mixed and kneaded by heating to a temperature higher than the softening point of the binder resin and lower than the thermo-decomposition temperature of the binder resin to disperse each raw material of toner in the binder resin by melting or softening the binder resin.

Known mixing and kneading machines including kneaders, two-axis extruders, two-roll mills, three-roll mills, laboblast mills, etc. can be used for melting and mixing and kneading.

Specific examples thereof include, but are not limited to, single or two-axis extruders such as TEM__100B (manufactured by Toshiba Machine Co., Ltd.) and PCM-65/87 and PCM__30 (manufactured by Ikegai Corp.) and open roll type mixing and kneading machines such as MOS 320__1800 and Kneadex (all manufactured by Nippon Coke & Engineering Co., Ltd.). The mixtures of the toner raw materials may be melted and mixed and kneaded by multiple mixing and kneading machines.

Pulverization Process

In the step 3 of the pulverization process, the melted and mixed and kneaded product obtained in the melting and mixing and kneading process is cooled down and solidified and thereafter pulverized to obtain a pulverized product. That is, the cooled-down and solidified pulverized product is coarsely pulverized by a hammer mill or a cutting mill to coarse pulverized products having a volume average particle diameter of, for example, around 100 µm to around 5 mm. Thereafter, the obtained coarse pulverized product is furthermore finely pulverized to a finely-pulverized product having a volume average particle diameter of, for example, 15 µm or less.

For example, jet type pulverizers to conduct pulverization using ultrasonic jet air stream, shock-type pulverizers to conduct pulverization by introducing the coarse pulverized products in a space formed between a rotor rotating at a high speed and a stator (liner), etc. can be used to finely pulverize the coarse pulverized products.

The cooled-down and solidified products can be directly pulverized by a jet type pulverizer, a shock-type pulverizer, etc. skipping the coarse pulverization by a hammer mill or a cutting mill.

Classification Process

In the step 4 of the classification process, extremely finely pulverized toner particles and coarse toner particles are removed from the pulverized product obtained in the pulverization process by a classifier. The extremely finely pulverized toner particles and coarse toner particles can be collected for reuse in manufacturing other toner. Known classifiers that can remove extremely finely pulverized toner particles and coarse toner particles by centrifugal or force of wind are suitably used for classification. For example, rotary type air classifiers can be used. It is preferable to conduct classification to obtain toner particles having a volume average particle diameter of from 3 to 15 µm by adjusting the classification conditions.

Emulsification Agglomeration Method

The emulsification agglomeration method includes a step 1 of agglomeration process, a step 2 of the attachment process, and a step 3 of the fusion process. Binder resin particles are generally manufactured by emulsification polymerization, etc.

Agglomeration Process

In the step 1 of the agglomeration process, binder resin particles are prepared from polymerizable monomers at the step of preparing the binder resin particles and dispersed in a solvent by an ionic surface active agent. Thereafter, other toner composition materials such as a coloring agent dispersed by an ionic surface active agent having a reverse polarity are mixed with the binder resin particles to form agglomerated particles by hetero agglomeration.

Attachment Process

In the step 2 of the attachment process, the binder resin particles are optionally furthermore added to the solution in which the binder resin particles are formed to attach them to the surface of the agglomerated particles to form a covering layer to cover the surface of the agglomerated particles. Toner having a core-shell structure is thus obtained.

Fusion Process

In the step 3 of the fusion process, the agglomerated particles obtained after the agglomeration process and the attachment process are fused by heating the agglomerated particles to a temperature equal to or higher than the glass transition temperature or melting point of the binder resins having the highest glass transition temperature or melting point among the contained binder resins.

Thereafter, the resultant is subjected to washing and drying to obtain toner.

As described above, the liquid dispersion in which toner materials are dispersed is mixed at once for agglomeration. Also, it is possible to add an attachment process. If the attachment process is added, in the state in which the balance among the amount of ionic dispersants of each polarity is intentionally broken down in the agglomeration process preliminarily, for example, an inorganic metal salt such as calcium nitride or a polymer of an inorganic metal salt such as aluminum polychloride is used to neutralize in terms of the ion property to form and stabilize agglomerated particles (core particles forming the core layer) at a temperature lower than the glass transition temperature or melting point of the binder resin.

Next, a liquid dispersion in which binder resin is dispersed by treatment of a dispersant having an amount and polarity to compensate the off-balance is added in the attachment process to attach the resin particles to the surface of the core particles. Furthermore, it is possible to slightly heat the resultant to a temperature equal to or lower than the glass transition temperature of the core particles or the binder resin contained in the additionally added liquid dispersion for stabilization at a higher temperature temporarily followed by heating to a temperature equal to or higher than the glass transition temperature for fusion.

In addition, this attachment process can be repeated several times.

Dissolution Suspension Method

In the case of the dissolution suspension method, temporarily dissolve binder resins, coloring agents, and other optional components such as releasing agents in an organic solvent such as ethylacetate and then disperse the resultant in an aqueous medium, etc. in which the resultant is insoluble together with organic dispersants such as polyvinylalcohol and sodium polyacrylate by applying a mechanical shearing force by a Homogenizer such as TK HOMOMIXER.

Next, add the thus obtained liquid dispersion in, for example, an aqueous solution of 1M hydrochloric acid to dissolve and remove the dispersant components followed by liquid-solid separation by Nutsche with a filter paper and distillation-away of the solvent components remaining in the particles to obtain toner.

Dissolution Emulsification Method

In the case of the dissolution emulsification method, dissolve the binder resin in a solvent such as ethyl acetate in which the binder resin is dissolved, apply a mechanical shearing force by a Homogenizer such as TK HOMOMIXER to the solution under the presence of an ionic surface active agent such as alkylbenzene sodium sulfonate to obtain emulsified resin particles, and distil away the remaining solvent therefrom by evaporation with a reduced pressure to obtain a resin particle liquid dispersion.

Thereafter, toner is obtained from the resin particle liquid dispersion in the same manner as in the emulsification agglomeration method.

Suspension Granulation Method

In the case of the suspension granulation method, preliminarily polymerize polymerizable monomers to prepare a polymer solution containing a preliminary polymer having a weight average molecular weight Mw of from 3,000 to 15,000 obtained from gel permeation chromatography (GPC) measuring, add a coloring agent, polymerizable monomers, a polymerization initiator, and other optional components such as releasing agents to the solution, apply a mechanical shearing force to the solution to suspend it under the presence of an inorganic or organic dispersant, and impart thermal energy while being stirred and sheared to obtain polymer particles.

The suspension granulation method is basically same as the suspension polymerization method but, by adjusting the weight average molecular weight of the preliminary polymer Mw in the range of from 3,000 to 15,000, the weight average molecular weight Mw of the binder resin contained in the produced toner can be controlled without a chain transfer agent in addition to obtaining a viscosity suitable for fixing and granulation.

Suspension Polymerization Method

In the case of the suspension polymerization method, toner is manufactured by forming polymerized particles by placing and stirring polymerizable mixture containing polymerizable monomers, a polymerizable initiator, a coloring agent, a releasing agent, etc. in an aqueous medium containing a suspension stabilizer. It is more preferable to granulate toner particles by stirring a polymerizable mixture containing polymerizable monomers, a polymerizable initiator, a coloring agent, a releasing agent, and a cationic polymer placed in an aqueous liquid dispersion to which an anionic dispersant is added. In the thus granulated toner, the releasing agent is encapsulated in the suspension particles, thereby improving the fixing property and offset resistance.

Ester Elongation Method

In the case of the ester elongation method, prepare an oil phase by dispersing a binder resin, a coloring agent, and other optional components such as a releasing agent in a solvent; Prepare an aqueous phase by dispersing a particle diameter controlling agent and a surface active agent in water; Mix and emulsify the oil phase and the aqueous phase to make oil droplets containing wax, polyester resins, pigments, etc. and converge the oil droplets to obtain toner oil droplets having a sharp particle size distribution; at the same time, conduct elongation reaction to form resin component polymers in the toner oil droplets; and thereafter, manufacture toner from the resin particle liquid dispersion in the same manner as in the emulsification suspension method.

Other Component

The toner of the present disclosure optionally contains other components. Other components include, for example, charge control agents, deforming agents, coloring agents, releasing agents, inorganic particulates, fluidity improvers, cleaning improvers, and magnetic materials.

Charge Control Agent

The toner of the present disclosure optionally contains a charge control agent to control the chargeability of the toner. There is no specific limit to the selection of the charge control agents.

Specific examples thereof include, but are not limited to, nigrosine, adine dyes containing an alkyl group having 2 to 26 carbon atoms (examined Japanese patent application publication no. S42-1627-A), basic dyes, for example, C. I. Basic Yellow 2 (C. I. 41000), C. I. Basic Yellow 3, C. I. Basic Red 1 (C. I. 41000), C. I. Basic Red 9 (C. I. 42500), C. I. Basic Violet 1 (C. I. 42535), C. I. Basic Violet 3 (C. I. 42555), C. I. Basic Violet 10 (C. I. 45170, C. I. Basic Violet 14 (C. I. 42510), C. I. Basic Blue 1 (C. I. 42025), C. I. Basic Blue 3 (C. I. 51005), C. I. Basic Blue 5 (C. I. 42140), C. I. Basic Blue 7 (C. I. 42595), C. I. Basic Blue 9 (C. I. 52015), C. I. Basic Blue 24 (C. I. 52030), C. I. Basic Blue 25 (C. I. 52025), C. I. Basic Blue 26 (C. I. 44045), C. I. Basic Green 1 (C. I. 42040), and C. I. Basic Green 4 (C. I. 42000), and lake pigments of these basic dyes, C. I. Solvent Black 8 (C. I. 26150), quaternary ammonium salts such as benzoyl methyl hexa decyl ammonium chloride and decyltrimethyl chloride, dialkyl tin compounds such as dibutyl tin compounds and dioctyl tin compounds, dialkyl tin borate compounds, guanidine derivatives, polyamine resins such as vinyl polymers containing amino groups and condensed polymers having amino groups, metal complex salt of monoazo dyes specified in examined Japanese patent application publications nos. S41-20153-A, S43-27596-A, S44-6397-A, and S45-26478-A, metal complex salts of Zn, Al, Co, Cr, Fe, etc. of salicylic acids, dialkylsalicylic acids, naphthoic acid, and dicarboxylic acids specified in examined Japanese patent application publications nos. S55-42752-A and S59-7385-A, sulfonated copper phthalocyanine pigments, organic borates, fluorine-containing quaternary ammonium salts, and Calixallene.

Use of charging control agents that impairs the target color should be avoided for color toners exclusive of black toner. Metal salts of white salicylic derivatives are preferably used.

The content of the charge control agent is preferably from 0.01 parts by weight to 2 parts by weight based on 100 parts by weight of the binder resin mentioned above and more preferably from 0.02 parts by weight to 1 parts by weight. When the content is within this range, a suitably charge controlling property is obtained without increasing the chargeability of toner excessively, decreasing the effect of the charge control agent, or inviting degradation of the fluidity of the toner or the image density by increased electrostatic force of attraction to a development roller.

Deforming Agent

The toner of the present disclosure optionally contains a deforming agent to deform the form of color toner. Any deforming agents that achieve this purpose can be suitably and selectively used. Deforming agents are preferable to contain laminar inorganic minerals in which at least a portion of the ions between the layers is modified by organic ions. There is no specific limit to the selection of the laminar inorganic minerals in which at least a portion of the ions between the layers is modified by organic ions. It is preferable to use a laminar inorganic mineral having a basic crystalline structure of smectite which is modified by organic cations. In addition, metal anions can be introduced into the laminar inorganic mineral by replacing part of the bivalent metal in the laminar inorganic minerals with a trivalent metal. However, since the hydrophilicity increases by the introduction of a metal anion, it is preferable to use a laminar inorganic mineral in which at least a portion of the metal anion is modified by organic anions.

There is no specific limit to the selection of organic cation modifiers of the laminar inorganic minerals in which at least a portion of the ions between the layers is modified by organic ions as long as the organic modifier modifies the laminar inorganic mineral in such a manner. Specific examples thereof include, but are not limited to, alkyl quaternary ammonium salts, phosphonium salts, and imidazolium salts. Among these, alkyl quaternary ammonium salts are preferable. Specific examples of the alkyl quaternary ammonium salts include, but are not limited to, trimethyl stearyl ammonium, dimethyl stearyl benzil ammonium, oleylbis(2-hydroxyethyl)methyl ammonium.

There is no specific limit to the selection of organic anion modifiers of the laminar inorganic minerals in which at least a portion of the ions between the layers is modified by organic ions as long as the organic ion modifies as described above.

Specific examples thereof include, but are not limited to, sulfates, sulfonates, carbonate, and phosphates having branched, non-branched, or cyclic alkyl (C1 to C44), alkenyl (C1 to C22), alkoxy (C8 to C32), hydroxyalkyl (C2 to C22), ethyleneoxide, propylene oxide, etc. Among these, carboxylic acids having an ethylene oxide skeleton are preferable.

By modifying at least a portion of the laminar inorganic minerals by organic ions, a suitable hydrophobic property is obtained so that the oil phase containing the toner components have a Non-Newtonian viscosity, thereby deforming the form of the toner. The content of the laminar inorganic mineral in which at least a portion of the ions between the layers is modified by organic ions in the toner materials is preferably from 0.05% by weight to 10% by weight and more preferably from 0.05% by weigh to 5% by weigh.

In addition, the laminar inorganic mineral in which at least a portion of the ions between the layers is modified by organic ions is suitably selected.

Specific examples thereof include, but are not limited to, montmorillonite, bentonite, hectorite, attapulgite, sepiolite, and mixtures thereof. Among these, organic-modified montmorillonite or bentonite is preferable because it is easy to adjust viscosity and demonstrates its effect in a small amount without affecting the toner properties.

Specific examples of the laminar inorganic minerals in which at least a portion of the ions between the layers is modified by organic cationic ions include, but are not limited to, quaternium 18 bentonites such as BENTONE 3, BENTONE 38, and BENTONE 38 (manufactured by Rheox Inc.), TIXOGEL (manufactured by United Catalysts Inc.), and CLAYTONE 34, CLAYTONE 40, and CLAYTONE XL (manufactured by Southern Clay Products Inc.); stearalkonium bentonites such as TIXOGEL LG (manufactured by United Catalysts Inc.), CLAYTONE AF and CLAYTONE APA (manufactured by Southern Clay Products Inc.); and quaternium 18/benzalkonium bentonites such as CLAYTONE HT and CLAYTONE PS (manufactured by Southern Clay Products Inc.). Among these, CLAYTONE AF and CLAYTONE APA are preferable. Moreover, a more preferred specific example of the laminar inorganic minerals in which at least a portion of the ions between the layers is modified by organic anionic ions is a material obtained by modifying DHT-4A (manufactured by Kyowa Chemical Industry Co., Ltd.) with an organic anion represented by the following Chemical structure 2. A specific example of the organic anion represented by the Chemical structure 2 is HITENOL 330T manufactured by Dai-Ichi Kogyo Seiyaku Co., Ltd.)

$$R_1(OR_2)_nOSO_3M \quad \text{Chemical structure 2}$$

In the Chemical structure 2, $R_1$ represents an alkyl group having 13 carbon atoms, $R_2$ represents an alkylene group having two to six carbon atoms, represents an integer of from 2 to 100, and M represents a monovalent metal element.

Coloring Agent

Suitable coloring agents for use in the toner of the present invention include known dyes and pigments. Specific examples of the coloring agents include, but are not limited to, carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like. These materials can be used alone or in combination.

There is no specific limit to the selection of the color of the coloring agent. At least the color is selected from black, cyan, magenta, and yellow. Each color toner is obtained by suitably selecting the kind of the coloring agent and color toner is preferable.

Specific examples of the coloring agents for black color include, but are not limited to, carbon black such as furnace black, lamp black, acetylene black, and channel black (C.I. Pigment Black 7), metals such as copper and iron (C.I. Pigment Black 11), metal compounds such as titanium oxide, and organic pigments such as aniline black (C.I. Pigment Black 1).

Specific examples of the coloring agents for magenta color include, but are not limited to, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:1, 49, 50, 51, 52, 53, 53:1, 54, 55, 57, 57:1, 58, 60, 63, 64, 68, 81, 83, 87, 88, 89, 90, 112, 114, 122, 123, 163, 177, 179, 202, 206, 207, 209, and 211; C.I. Pigment Violet 19; and C.I. Pigment Vat Red 1, 2, 10, 13, 15, 23, 29, and 35.

Specific examples of the coloring agents for cyan color include, but are not limited to, C.I. Pigment Blue 2, 3, 15, 15:1, 15:2, 15:3, 15:4, 15:6, 16, 17, and 60; C.I. Pigment Vat Blue 6; C.I. Pigment Acid Blue 45: copper phthalocyanine pigments in which one to five phthalimide methyl groups are introduced into the phthalocyanine skeleton; and Green 7 and 36.

Specific examples of the pigments for yellow color include, but are not limited to, C.I. Pigment Yellow 0-16, 1, 2, 3, 4, 5, 6, 7, 10, 11, 12, 13, 14, 15, 16, 17, 23, 55, 65, 73, 74, 83, 97, 110, 151, 154, and 180: C.I. Pigment Vat Yellow 1, 3, and 20; and Orange 36.

The content of the coloring agent in the toner is preferably from 1% by weight to 15% by weight and more preferably from 3% by weight to 10% by weight. When the content of the coloring agent is too small, the coloring performance of the toner tends to deteriorate. To the contrary, when the content of the coloring agent is too great, dispersion of a pigment in the toner tends to be insufficient, thereby degrading the coloring performance and the electric characteristics of the toner.

The coloring agent can be used in combination with a resin as a master batch. There is no specific limit to such a resin.

Specific examples thereof for use in the master batch include, but are not limited to, polyester, polymers of styrene or substituted styrene such as polystyrene, copolymers of styrene, polymethyl methacrylate, polybutyl methacrylate, polyvinyl chloride, polyvinyl acetate, polyethylene, polypropylene, polyesters, epoxy resins, epoxy polyol resins, polyurethane, polyamide, polyvinyl butyral, polyacrylate, rosin, modified rosins, terpene resins, aliphatic hydrocarbon resins, alicyclic hydrocarbon resins, aromatic petroleum resins, chlorinated paraffin, paraffin waxes, etc. It is also possible to use a polyester resins having a polyhydroxycarboxylic acid skeleton, which is preferable in terms of improvement of the compatibility and the plant degree. These materials can be used alone or in combination.

The master batch can be manufactured by applying a high shearing force to the resin and the coloring agent while mixing and/or kneading. In this case, an organic solvent can be added to boost the interaction between the coloring agent and the resin. In addition, so-called flushing method is also preferable because the wet cake of the coloring agent can be used as it is, which is advantageous in that there is no need to drying.

The flushing method is a method in which a water paste containing water of a coloring agent is mixed and/or kneaded with an organic solvent to transfer the coloring agent to the resin side, thereby removing water and the organic solvent. High shearing dispersion devices such as a three-roll mill, etc. can be used for mixing and kneading.

Releasing Agent

There is no specific limit to the selection of the releasing agents for use in toner and any known releasing agent can be suitably used. For examples, waxes can be suitably used.

Specific examples of the waxes include, but are not limited to, carnauba wax from which free fatty acid is removed, polyethylene wax, montan wax, oxidized rice wax. These can be used alone or in combination. Preferable carnauba wax is fine crystalline and has an acid value of 5 or below and a particle diameter of 1 μm or less when dispersed in the toner binder. Montan wax generally means a montan-based wax refined from minerals and preferably fine crystalline like carnauba wax and has an acid value of from 5 to 14. Oxidized rice wax is obtained by oxidizing rice-bran wax with air and preferably has an acid value of from 10 to 30. These waxes can be used alone or in combination.

Any other known releasing agent such as solid silicone wax, higher aliphatic acid higher alcohols, montan-based ester wax, polyethylene wax, and polypropylene wax can be used alone or in combination.

There is no specific limit to the glass transition temperature of the releasing agent. It is preferably from 70° C. to 90° C. When the glass transition temperature is too low, the high temperature preservation property of toner tends to deteriorate. When the glass transition temperature is too high, the releasing performance tends to deteriorate at a low temperature, thereby degrading the cold offset resistance and causing winding of paper around the fixing device. There is no specific limit to the content of the releasing agent. It is from 1% by weight to 20% by weight and preferably from 3% by weight to 10% by weight based on the toner resin component. When the content is too low, the offset resistance performance tends to deteriorate. When the content is too high, the transferability and the durability tend to deteriorate.

Inorganic Particulate

The toner of the present disclosure optionally contains inorganic particulates as an external additive to impart or improve the fluidity, developability, chargeability, etc.

Any known inorganic particulate can be suitably selected and specific examples thereof include, but are not limited to, silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. These materials can be used alone or in combination. The inorganic particulate preferably has a primary particle diameter of from 5 nm to 2 μm and more preferably from 5 nm to 500 nm. The content of the inorganic particulates is preferably from 0.01% by weight to 5.0% by weight and more preferably from 0.01% by weight to 2.0% by weight. The fluidity, developability, and chargeability are improved by the inorganic particulate when the content thereof is within this range.

Fluidity Improver

Fluidity improvers prevent deterioration of the fluidity and the chargeability in a high moisture environment by increasing a hydrophobicity by surface treatment.

Specific examples thereof include, but are not limited to, silane coupling agents, silylation agents, silane coupling agents including a fluoroalkyl group, organic titanate coupling agents, aluminum coupling agents, silicone oils, and modified silicone oils. Among these, it is preferable to use hydrophobic silica and hydrophobic titanium oxide which are obtained by surface-treating silica and titanium oxide by such a fluidity improver.

Cleaning Property Improver

The cleaning property improver is added to toner to remove development agents (typically toner) remaining on the surface of an image bearing member such as a photoreceptor and a primary transfer medium. Specific examples of the cleaning property improvers include, but are not limited to, zinc stearate, calcium stearate, metal salts of aliphatic acids such as stearic acid, and polymer particulates such as polymethyl methacrylate particulates and polystyrene particulates, which are prepared by soap-free emulsification polymerization. The polymer particulate preferably has a relatively sharp particle size distribution and preferably has a volume average particle diameter of from 0.01 μm to 0.1 μm.

Magnetic Material

There is no specific limit to the selection of the magnetic materials and any known magnetic material can be suitably used.

Specific examples thereof include, but are not limited to, iron powder, magnetite, and ferrite. Among these, white magnetic materials are preferable in terms of color tone.

Development Agent

Next, the developing agent in the present disclosure is described.

The development agent includes at least toner of the present disclosure and other optional components such as a carrier. Any of one-component development agents and two-component development agents can be suitably used but the two-component development agents are preferable in terms of prolonging the length of the working life particularly when used in a high speed printer, etc. that meets the demand for high speed information processing of late.

Carrier

There is no specific limit to the selection of the carrier. Carriers are preferable which include a core material and a resin layer that covers the core material.

There is no specific limit to the selection of the core material and any known material can be suitably used. For example, manganese-strontium (Mn—Sr) based materials and manganese-magnesium (Mn—Mg) based materials having 50 emu/g to 90 emu/g are preferable and high magnetized materials such as iron powder (100 emu/g or higher) and magnetite (75 emu/g to 120 emu/g) are more preferable in terms of securing the image density. In addition, weakly magnetized materials such as copper-zinc (Cu—Zn) based materials having 30 emu/g to 80 emu/g are preferable in terms of reducing the impact of the contact between the latent image bearing member and the toner filaments formed on the development device, which is advantageous in improvement of the image quality. These can be used alone or in combination.

The particle diameter of the core material preferably has a weight average particle diameter (D50) of from 10 μm to 200 μm and more preferably from 40 μm to 200 μm. When the weight average particle diameter (D50) is too small, fine powder tends to increase in the distribution of the carrier particles and the magnetization per particle tends to decrease, which leads to scattering of the carrier particles. When the volume average particle diameter (D50) is too large, the specific surface area tends to decrease, resulting in scattering of toner. In full color image in which solid portions occupy a large are, reproducibility tends to deteriorate particularly in the solid portions.

There is no specific limit to the selection of the materials for the resin layer mentioned above and any known resin can be suitably used. Specific examples thereof include, but are not limited to, amino-based resins, polyvinyl-based resins, polystyrene-based resins, polycarbonate-based resins, polyethylene resins, polyvinyl fluoride resins, polyvinylidene fluoride resins, polytrifluoroethylene resins, polyhexafluoro propylene resins, copolymers of vinylidene fluoride and acrylate monomer, copolymers of vinylidene fluoride and vinylfluoride, fluoro terpolymers {tri(multi)-fluorine copolymers) such as terpolymers of tetrafluoroethylene, fluorovinylidene, and a monomer including no fluorine atom, and silicone resins. These can be used alone or in combination. Among these, silicone resins are particularly preferable.

There is no specific limit to the selection of the silicone resins and any known silicone resin can be suitably used.

Specific examples thereof include, but are not limited to, straight silicone resins formed of only organosiloxane bonding; and silicone resins modified by alkyd resins, polyester resins, epoxy resins, acrylic resins, urethane resins, etc.

Specific examples of the straight silicone resins available in the market include, but are not limited to, KR271, KR255, and KR152 (manufactured by Shin-Etsu Chemicals Co., Ltd.) and SR 2400, SR2406, and SR2410 (manufactured by Dow Corning Toray Co., Ltd.).

Specific examples of the modified silicone resins available in the market include, but are not limited to, KR206 (alkyd-modified) (manufactured by Shin-Etsu Chemicals Co., Ltd.), KR5208 (acrylic-modified), ES1001N (epoxy-modified), and KR305 (urethane-modified) manufactured by Shin-Etsu Chemicals Co., Ltd.); and SR2115 (epoxy-modified) and SR2110 (alkyd-modified) (manufactured by Dow Corning Toray Co., Ltd.).

It is possible to use silicon resins alone or together with a component subjected to cross-linking reaction, a charge amount controlling component, etc.

It is also possible to optionally contain electroconductive powder in the resin layer. Specific examples of the electroconductive powder include, but are not limited to, metal powder, carbon black, titanium oxide, tin oxide, and zinc oxide. The average particle diameter of such electroconductive powder is preferably not greater than 1 μm. When the average particle diameter is too large, controlling the electric resistance may become difficult.

The resin layer described above can be formed by, for example, dissolving the silicone resin mentioned above in an organic solvent to prepare a liquid application and applying the liquid to the surface of the core material mentioned above by a known application method followed by drying and baking. Specific examples of the known application methods include, but are not limited to, a dip coating method, a spray coating method, and brushing method.

There is no specific limit to the selection of the solvent.

Specific examples thereof include, but are not limited to, toluene, xylene, methylethylketone, methylisobutyll ketone, and cellosolve butylacetate.

There is no specific limit to the baking. Any of the external heating system or the internal heating system can be used. For example, methods of using a fixed electric furnace, a fluid electric furnace, a rotary electric furnace, a burner furnace, and a microwave are suitably used.

The content of the carrier in the resin layer is preferably from 0.01% by weight to 5.0% by weight. When the content of the carrier is too small, a uniform resin layer may not be formed on the surface of the core material. When the content of the carrier is too large, the resin layer tends to be too thick, causing granulation of carrier particles so that uniform carrier particles my not be obtained.

When the development agent is a two component development agent, there is no specific limit to the content of the carrier in the two component development agent. For example, the content ratio of the toner and carrier in the two component development agent is preferably from 1.0 part by weight to 10.0 parts by weight based on 100 parts by weight of the carrier Image Forming Method, Image Forming Apparatus, and Process Cartridge The image forming method in the present disclosure includes at least a latent electrostatic image forming process, a development process, a transfer process, and a fixing process with optional processes such as a cleaning process, a discharging process, a recycling process, and a control process.

The toner of the present disclosure can be used in image forming apparatus that includes at least a latent electrostatic image bearing member, a latent electrostatic image forming device, a development device, a transfer device, and a fixing device with optional devices such as a cleaning device, a discharging device, a recycling device, and a control device.

Latent Electrostatic Image Forming Process and Latent Electrostatic Image Forming Device The latent electrostatic image forming process is a process of forming latent electrostatic images on the surface of a latent electrostatic image bearing member.

There is no specific limit to the (latent electrostatic) image bearing member (also referred to as photoreceptor or photoconductor) with regard to the material, the form, the structure, the size, etc. and any known image bearing member can be suitably selected. An image bearing member having a drum form is preferred.

Also, an inorganic image bearing member formed of amorphous silicone or selenium and an organic image bearing member formed of polysilane or phthalopolymethine are selected in terms of materials. Among these, amorphous silicon, etc. is preferred in terms of the length of the working life of image bearing member.

Latent electrostatic images are formed by, for example, uniformly charging the surface of the image bearing member and irradiating the surface according to the obtained image information using a latent electrostatic image forming device.

The latent electrostatic image forming device includes at least a charger which uniformly charges the surface of the image bearing member and an irradiator which irradiates the surface of the image bearing member according to the obtained image information.

The surface of the image bearing member is charged by, for example, applying a voltage to the surface of the image bearing member with the charger. There is no specific limit to the charger and any known charger can be selected. For example, a known contact type charger having an electroconductive or semi-electroconductive roll, brush, film, rubber blade, etc. and a non-contact type charger such as a corotron or a scorotron which uses corona discharging can be used.

It is preferable that a charger arranged in contact with or in the vicinity of the latent image bearing member apply a direct voltage to which an alternative voltage is overlapped to the surface of the latent image bearing member.

It is also preferable that a charging roller arranged in the vicinity of the latent image bearing member via a gap tape to avoid contact of the charging roller and the latent image bearing member apply a direct voltage with which an alternative voltage is overlapped to the surface of the latent image bearing member.

The irradiation is conducted by, for example, an irradiator that irradiates the surface of the image bearing member according to image data. There is no specific limit to the selection of the irradiator as long as the irradiator irradiates the surface of a latent image bearing member charged by a charger according to image data information.

Specific examples thereof include, but are not limited to, various kinds of irradiators such as photocopying optical systems, rod-lens array systems, laser optical systems, and liquid crystal shutter optical systems. As to the present disclosure, the rear side irradiation system in which an image bearing member is irradiated from the rear side thereof can be also employed.

Development Process and Development Device

The development process is a process of developing a latent electrostatic image with the toner or the development agent of the present disclosure to obtain a visual image. The visual image is formed by, for example, developing the latent electrostatic image with the toner or the development agent of the present disclosure by a development device. Any known development device that can develop the latent electrostatic images with the toner or the development agent of the present disclosure is suitably selected. For example, a development device that accommodates the toner or the development agent of the present disclosure and includes at least a development unit which provides the toner or the development agent to the latent electrostatic image in a contact or non-contact manner can be suitably used.

The development unit employs a dry or wet development system and a monochrome or full color development unit. For example, a development unit is suitable which includes a stirrer that triboelectrically charges the toner or the development agent and a rotary magnet roller.

In the development unit, for example, toner and carrier are mixed and stirred to triboelectrically charge the toner. The charged toner stands on the surface of the magnet roller in rotation like filaments to form a magnetic brush. Since the magnet roller is provided in the vicinity of the image bearing member, part of the toner forming the magnetic brush borne on the surface of the magnet roller is transferred to the surface of the image bearing member by the force of the electric attraction. As a result, the latent electrostatic image is developed with the toner to form a visual image on the surface of the latent image bearing member (photoreceptor).

Transfer Process and Transfer Device

The transfer process is a process of transferring the visual image to a recording medium. However, it is preferable that the visual image be primarily transferred to an intermediate transfer body and thereafter secondarily transferred to a recording medium. Further, it is more preferred to use a two-color toner, preferably a full color toner in which the visual image is primarily transferred to an intermediate transfer body to form a complex transfer image thereon and the complex transfer image is thereafter secondarily transferred to a recording medium. The transfer process can be conducted by, for example, charging the latent electrostatic image bearing member (photoreceptor) using a transfer charger by the transfer device. The transfer device preferably has a primary transfer device to form a complex transfer image by transferring the visual image to an intermediate transfer body and a secondary transfer device to transfer the complex transfer image to a recording medium. There is no specific limit to the intermediate transfer body and any known transfer body, for example, a transfer belt can be selected.

The transfer device (the primary transfer device and the secondary transfer device) preferably has a transfer unit that peels off and charges the visual image formed on the latent electrostatic image bearing member to the side of the recording medium. It is also possible to provide and use two or more transfer devices. Specific examples of the transfer device include, but are not limited to, a corona transfer device using corona discharging, a transfer belt, a transfer roller, a pressure transfer roller, and an adhesive transfer device. There is no specific limit to the selection of the recording medium and any known recording medium can be suitably used.

Fixing Process and Fixing Device

The fixing process is a process in which the visual image transferred to the recording medium is fixed by the fixing device and can be conducted every time color toner is transferred to the recording medium or at once for layered color toner image. There is no specific limit to the fixing device and known heat and pressure applicators are preferable. Known heat and pressure applicator are preferably formed of, for example, a combination of a heating roller and a pressure roller or a combination of a heating roller, a pressure roller, and an endless belt. A suitable fixing device has a heating body having a heating element, a film in contact with the heating body, and a pressing member that is pressed against the heating body via the film to fix the unfixed image on the recording medium while the unfixed image on the recording medium passes between the film and the pressing member. The heating temperature by the heat and pressure applicator is preferably from 80° C. to 200° C. In addition, in the present disclosure, any known optical fixing device can be used together with or instead of the fixing device in the fixing process described above.

Other Processes and Devices
Discharging Process and Discharger

The discharging process is a process in which a discharging bias is applied to the image bearing member to discharge the image bearing member and is suitably performed by a discharger. There is no specific limit to the discharger and any known discharger that can apply a discharging bias to the image bearing member is suitably selected. For example, a discharging lamp is suitably used.

Cleaning Process and Cleaner

The cleaning process is a process of removing toner remaining on the surface of the latent image bearing member after transfer of the image and can be suitably conducted by a cleaner. Any known cleaning device that can remove the toner remaining on the surface of the latent image bearing member can be suitably selected and used. Specific examples thereof include, but are not limited to, magnetic brush cleaners, electrostatic brush cleaners, blade cleaners, brush cleaners, and web cleaners.

Recycling Process and Recycling Device

The recycle process is a process of returning the toner removed in the cleaning process to the development device and suitably conducted by a recycling device. Any known recycling device can be suitably selected and used.

Control Process and Controller

The controlling process mentioned above is a process of controlling each process in the image forming method using the toner (development agent) of the present disclosure and suitably performed by a controller. There is no specific limit to the controller as long as the controller controls the performance of each device. For example, devices such as a sequencer and a computer can be used.

An embodiment in which the image forming apparatus using the toner of the present disclosure forms images by the image forming method using the toner of the present disclosure is described with reference to FIG. 2. An image forming apparatus 100 illustrated in FIG. 2 has: a photoreceptor drum (image bearing member) 10 serving as a latent electrostatic image bearing member, a charging roller 20 serving as the charger; an irradiator 30, a development device 45, an intermediate transfer body 50, a cleaner 60 having a cleaning blade, and a discharging lamp 70 as the discharging device.

Figure 2:
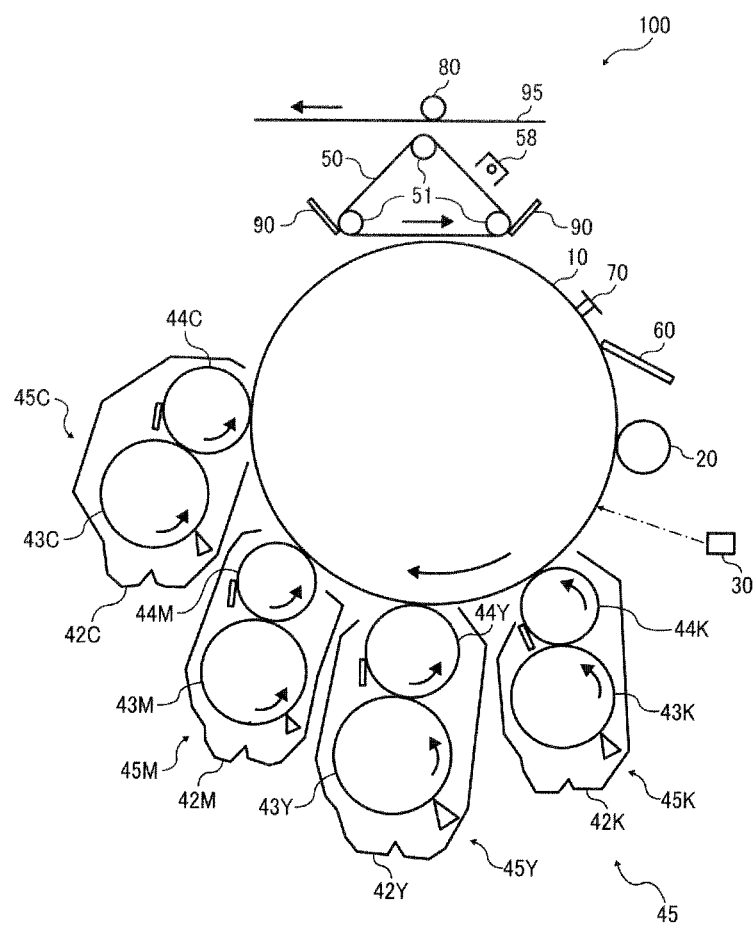
FIG. 2 is a schematic diagram illustrating an example of the structure of an image forming apparatus for use in image forming using toner of the present disclosure.

The intermediate transfer body 50 is an endless belt and designed to be movable in the direction indicated by the arrow in FIG. 2 by three rollers 51 suspending the endless belt from inside. Part of the three rollers 51 serves as transfer bias rollers that can apply a predetermined transfer bias (primary transfer bias) to the intermediate transfer body 50. A cleaner 90 such as a cleaning blade for the intermediate transfer body is provided in the vicinity of the intermediate transfer body 50 and a transfer roller 80 that can apply a transfer bias is provided facing the intermediate transfer body 50 to (secondarily) transfer the visual image (toner image) to a recording medium 95 such as transfer paper.

Around the intermediate transfer body 50, a corona charger 58 is provided between the contact portion of the image bearing member 10 and the intermediate transfer body 50 and the contact portion between the intermediate transfer body 50 and the recording medium 95 relative to the rotation direction of the intermediate transfer body 50 to impart charges to the visual image on the intermediate transfer body 50.

The development device 45 is formed of a black developing unit 45K, a yellow developing unit 45Y, a magenta developing unit 45M, and a cyan developing unit 45C. The black developing unit 45K has a development agent container 42K, a development agent supplying roller 43K, and a development roller 44K. The yellow developing unit 45Y has a development agent container 42Y, a development agent supplying roller 43Y, and a development roller 44Y. The magenta developing unit 45M has a development agent container 42M, a development agent supplying roller 43M, and a development roller 44M. The cyan developing unit 45C has a development agent container 42C, a development agent supplying roller 43C, and a development roller 44C.

In the image forming apparatus 100 illustrated in FIG. 2, the charging roller 20 uniformly charges the image bearing member 10. The irradiator 30 irradiates the image bearing member 10 according to the obtained image data to form a latent electrostatic image. Toner is supplied from the development device 45 to develop the latent electrostatic image formed on the image bearing member 10 to obtain a visual (toner) image. This visual (toner) image is (primarily) transferred to the intermediate transfer body 50 by the voltage applied by the rollers 51 and thereafter (secondarily) transferred to the recording medium 95 such as transfer paper.

As a result, a transfer image is formed on the recording medium 95 such as transfer paper. The toner remaining on the image bearing member 10 is removed by the cleaner 60 and charges remaining on the image bearing member 10 is temporarily removed by the discharger 70.

Figure 3:
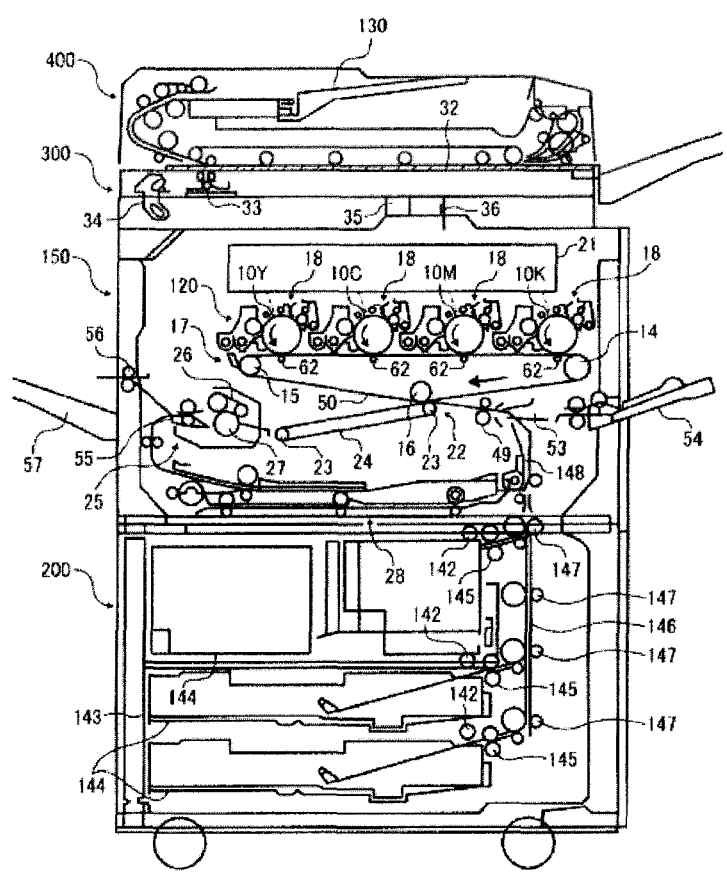
FIG. 3 is a schematic diagram illustrating an example of the structure of a tandem-type color image forming apparatus for use in image forming using the toner of the present disclosure.
Figure 4:
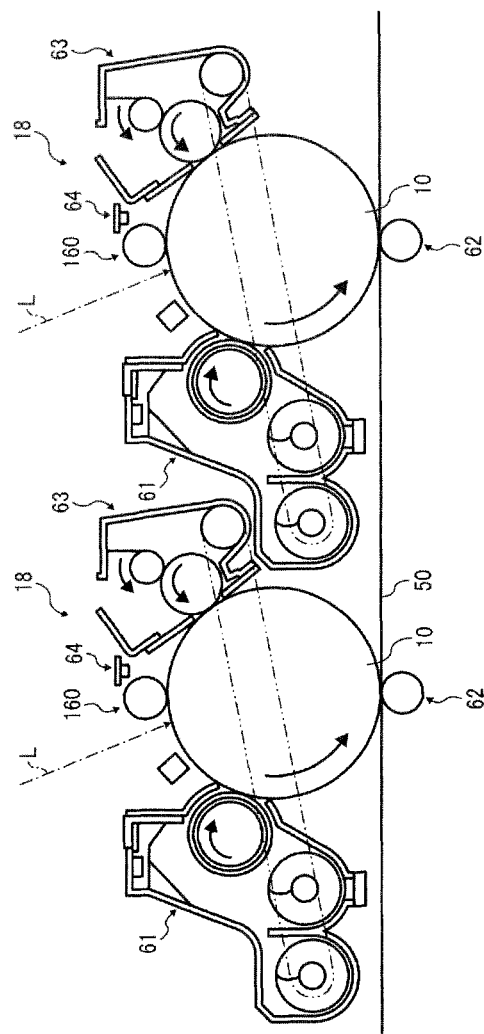
FIG. 4 is an enlarged schematic diagram of a portion of the image forming apparatus illustrated in FIG. 3.

Another embodiment in which the image forming apparatus using the toner of the present disclosure forms images by the image forming method using the toner of the present disclosure is described with reference to FIG. 3. The tandem type image forming apparatus illustrated in FIG. 3 is a tandem type full color image forming apparatus. This tandem image forming apparatus has a photocopying device 150, a paper feeder table 200, a scanner 300, and an automatic document feeder (ADF) 400. FIG. 4 is an enlarged schematic diagram of a portion of the image forming apparatus illustrated in FIG. 3.

The photocopying device 150 has an intermediate transfer body 50 having an endless belt at the center. The intermediate transfer 50 is suspended over support rollers 14, 15, and 16 and rotatable clockwise in FIG. 3.

An intermediate transfer cleaning device 17 is provided around the support roller 15 to remove the un-transferred residual toner on the intermediate transfer body 50.

A tandem development device 120 having four image forming units 18 for yellow, cyan, magenta, and black is arranged facing the intermediate transfer body 50 along the transfer direction of the intermediate transfer body 50 between the support rollers 14 and 15 of the intermediate transfer body 50.

An irradiation device 21 is arranged in the vicinity of the tandem development device 120. A secondary transfer device 22 is arranged opposite to the tandem development device 120 with the intermediate transfer body 50 therebetween. In the secondary transfer device 22, a secondary transfer belt 24 having an endless form is suspended over a pair of rollers 23 and the recording medium conveyed on the secondary transfer belt 24 is contactable with the intermediate transfer body 50.

A fixing device 25 is arranged in the vicinity of the secondary transfer device 22. The fixing device 25 has a fixing belt 26 having an endless form and a pressing roller 27 pressed by the fixing belt 26.

In addition, in the tandem image forming apparatus, a sheet reverse device 28 to form images on both sides of the recording medium by reversing the recording medium is arranged in the vicinity of the secondary transfer device 22 and the fixing device 25.

Next, the formation of a full color image using the tandem development device 120 is described. First, set a document (original) on a document table 130 or open the automatic document feeder 400, set a document on a contact glass 32 on the scanner 300, and close the automatic document feeder 400.

By pressing a start button, after the document is moved to the contact glass 32 when the document is set on the automatic document feeder 400 or immediately when the document is set on the contact glass 32, the scanner 300 is driven to scan the document on the contact glass 32 with a first scanning unit 33 and a second scanning unit 34.

Then, the document is irradiated with light from the first scanning unit 33, reflection light from the document is redirected at the first scanning unit 33 to the second scanning unit 34. The redirected light is reflected at the mirror of the second scanning unit 34 to a reading sensor 36 through an image focusing lens 35 to read the color document (color image) to obtain black, yellow, magenta, and cyan image data information.

Each data information for black, yellow, magenta, and cyan is conveyed to each image formation unit 18 (image formation units for black, yellow, magenta and cyan) in the tandem development device 120 to form each color toner image by each image formation unit. Each image formation unit 18 (image formation units for black, yellow, magenta and cyan) in the tandem development device 120 includes a photoreceptor 10 (a photoreceptor 10K for black, a photoreceptor 10Y for yellow, a photoreceptor 10M for magenta and a photoreceptor 10C for cyan), a charger 160 that uniformly charges the photoreceptor 10, an irradiator that irradiates the photoreceptor 10 according to each color image data information with beams of light L, a development unit 61 that forms a toner image with each color toner by developing each latent electrostatic image with each color toner (black toner, yellow toner, magenta toner, and cyan toner), a transfer charger 62 that transfers the toner image to the intermediate transfer body 50, a cleaning device 63, and a discharger 64 as illustrated in FIGS. 3 and 4.

Each single color image (black image, yellow image, magenta image, and cyan image) is formed based on each color image information. The thus formed black color image, yellow color image, magenta color image, and cyan color image on the photoreceptor 10K for black, a photoreceptor 10Y for yellow, a photoreceptor 10M for magenta, and a photoreceptor 10C for cyan, respectively, is primarily and sequentially transferred to the intermediate transfer body 50 rotated by the support rollers 14, 15, and 16. Then, the black color image, the yellow color image, the magenta color image, and the cyan color image are overlapped on the intermediate transfer body 50 to form a synthesized color image (complex transfer image).

In the sheet feeder table 200, one of the sheet feeder rollers 142 is selectively rotated to feed a recording medium (sheet) from one of sheet feeder cassettes 144 multiply stacked in a sheet bank 143 to a sheet feeding path 146 by separating the recording media one by one by a separation roller 145. Then, the recording medium is guided by transfer rollers 147 to a sheet path 148 in the photocopying portion 150, and blocked at a registration roller 49. Alternatively, a sheet (recording medium) on a manual feeder tray 54 separated one by one by a separation roller 145 is fed by rotating a paper feeder roller 142 to a manual feeding path 53 and blocked at the registration roller 49.

The registration roller 49 is typically grounded but the bias is not necessarily zero in order to remove paper dust on the recording medium. The registration roller 94 is rotated in synchronization with the synthesized color image (color transfer image) on the intermediate transfer body 50 to feed the recording medium (sheet) between the intermediate transfer body 50 and the secondary transfer device 22.

The synthesized color image (color transfer image) is secondarily transferred to the recording medium (sheet) to obtain a color image thereon. The residual toner remaining on the intermediate transfer body 50 after the image is transferred is removed by a cleaning device 17 for the intermediate transfer body.

The recording medium to which the color image is transferred is sent to the fixing device 25 by the secondary transfer device 22 and the synthesized color image is fixed on the recording medium by application of heat and pressure at the fixing device 25. Thereafter, the recording medium is discharged outside by a discharging roller 56 by a switching claw 55 and stacked on a discharging tray 57.

Alternatively, the recording medium is guided again to the transfer position by the switching claw 55 and the sheet reverse device 28 and then another image is formed on the reverse side. Thereafter, the recording medium is discharged by the discharging roller 56 and stacked on the discharging tray 57.

Process Cartridge

The process cartridge for use in the present disclosure includes at least an image bearing member that bears a latent electrostatic image, a development device that develops the latent electrostatic image borne on the image bearing member with a development agent or toner to obtain a visual image, and other optional suitably selected devices. The process cartridge is detachably attachable to the image forming apparatus.

The development device includes a development agent container accommodating the toner or the development agent containing the toner, a development agent bearing member that bears and transfers the toner or the development agent accommodated in the development agent container, and other optional devices such as a layer thickness regulator that regulates the layer thickness of the toner borne on the development agent bearing member.

The process cartridge described above is detachably attachable to various kinds of electrophotographic image forming apparatuses and preferably detachably attachable to the image forming apparatus described above.

Figure 5:
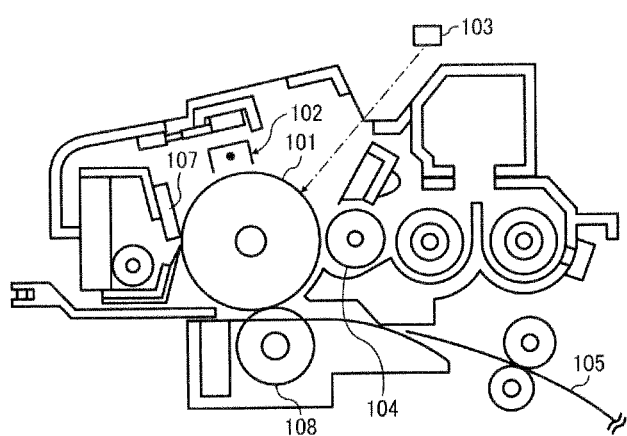
FIG. 5 is a schematic diagram illustrating an example of the structure of a process cartridge installable in the image forming apparatus and using the toner of the present disclosure.

The process cartridge includes, for example, a latent image bearing member 101, a charger 102, a development device 104, a transfer device 108, a cleaning unit 107, and other optional devices as illustrated in FIG. 5. In FIG. 5, the numeral references 103 and 105 represent beams of light emitted by an irradiator and a recording medium, respectively.

Next, the image formation process by the process cartridge illustrated in FIG. 5 is described.

The latent image bearing member 101 is charged by the charger 102 and irradiated with the beams of light 103 by an irradiator while rotating in the direction indicated by the arrow to form a latent electrostatic image corresponding to the irradiation image on the surface of the latent image bearing member 101.

This latent electrostatic image is developed by the development device 104 and the obtained visual image is transferred by the transfer roller 108 to the recording medium 105 for printout.

The surface of the latent image bearing member after the image is transferred is cleaned by the cleaner 107 and discharged by a discharger to be ready for the next image forming process again.

Having generally described (preferred embodiments of) this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Measuring Method of Properties of Component in Examples A-1 to A-21 and Comparative Examples A-1 and A-2

Measuring of Molecular Weight and Remaining Monomer

Device: GPC (manufactured by Toso Corporation)
Detector: RI Measuring Temperature: 40° C.
Transfer Phase: tetrahydrofuran
Flowing Amount: 0.45 ml/min.

Molecular weights Mn and Mw and molecular weight distribution Mw/Mn are the number average molecular weight, the weight average molecular weight, and the molecular weight distribution, respectively, which are measured by gel permeation chromatography (GPC) referring to the standard curve made from a polystyrene sample the molecular weight of which is known.

Measuring of 90% RH Thermal Distortion Temperature
Device: TMA (EXSTAR 7000, manufactured by SII Nano-Technology Inc.)

Fill a sample of 5 mg to 10 mg in a die having a $\phi$ of 3 mm and a thickness of 1 mm and mold it to form a tablet by compression by a hand press for measuring. Use the temperature/moisture controller attached to the device to track the transition of the sample under the condition in which the temperature is increased from 30° C. to 90° C. at a temperature rising speed of 2° C./min. at 90% RH followed by a pressure of 100 mN using a standard probe. The peak top in the obtained thermogram is defined as 90% RH thermal distortion temperature and the sample is evaluated.

Measuring of Glass Transition Temperature (Tg)
Device: DSC (Q2000, manufactured by TA instruments)
Fill a sample of 5 mg to 10 mg in a simple aluminum sealed pan for the following measuring flow.

First heating: 30° C. to 220° C., temperature rising speed: 5° C./min., one minute maintained after 220° C.

Cooling down: Quench to −20° C. without temperature control, one minute maintained after −20° C.

Second heating: −20° C. to 180° C., temperature rising speed: 5° C./min.

The glass transition temperature is read by a mid point method in the thermogram in the second heating.

Measuring of Softening Point
Device: Flow Tester (CFT-500D, manufactured by Shimadzu Corporation)
Sample: 1.5 g
Temperature rising speed: 10° C./min.
Load: 10 Kg
Nozzle: Diameter=0.5 mm, Length=1 mm
Heating. Starting Temperature: 50° C.
Preliminary heating time: 300 seconds
½ Method: Softening point is defined as the temperature at which a half of the sample has flown out.

Evaluation of Organic Solvent Solubility

Place 1.5 g of the synthesized resin in each solvent of 8.5 g of three kinds of solvents, which are ethyl acetate, tetrahydrofuran, and toluene, stir the liquid for 24 hours in a 20 ml screw vial, and check whether there is a un-dissolved component by naked eyes. The resin which has been dissolved in all of the three solvents is determined as soluble in organic solvent.

Manufacturing Example A-1

Synthesis of Resin Precursor A-1

Place 85.0 parts by weight of L-lactide, 15.0 parts by weight of D-lactide, and 62 parts by weight of cholesterol as an initiator, gradually raise the temperature of the system, and dehydrate it under a reduced pressure.

Next, raise the temperature furthermore under purging of $N_2$, confirm the system has become uniform by naked eyes, and place 0.03 parts by weight of tin 2-ethyl hexanoate to conduct polymerization reaction. The temperature in the system is controlled not to be higher than 190° C. After a two-hour reaction, the system is switched to an outflow line again to remove non-reacted lactide under a reduced pressure environment and complete the polymerization reaction to obtain a resin precursor A-1.

Manufacturing Examples A-2 to A-9

Synthesis of Resin Precursors A-2 to A-9

The resin precursors A-2 to A-9 are manufactured in the same manner as in Manufacturing Example A-1 except that the kind and the content of the initiator are changed as shown in Table A-1.

TABLE A-1

| | Initiator | |
| --- | --- | --- |
| | Kind | Content (Parts by weight) |
| Resin precursor A-1 | Cholesterol | 62 |
| Resin precursor A-2 | Cholesterol | 18 |
| Resin precursor A-3 | Cholesterol | 4 |
| Resin precursor A-4 | Chemical compound P | 21 |
| Resin precursor A-5 | Chemical compound P | 12 |
| Resin precursor A-6 | Chemical compound P | 3 |
| Resin precursor A-7 | Chemical compound Q | 6 |
| Resin precursor A-8 | Chemical compound R | 2 |
| Resin precursor A-9 | Lauryl alcohol | 2 |

The compounds P, Q, and R in Table A-1 are as follows:

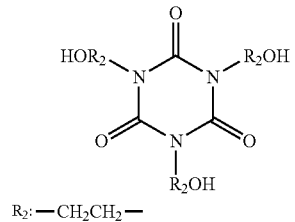

Chemical compound P

R₂: —CH₂CH₂—

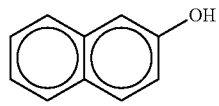

Chemical compound Q

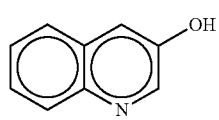

Chemical compound R

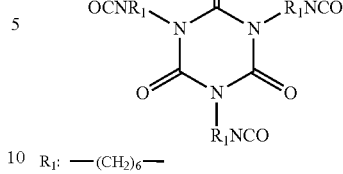

Chemical compound S

R₁: —(CH₂)₆—

Manufacturing Examples A-12 to A-17

Synthesis of Resins A-2 to A-7

Resins 2 to 7 are obtained in the same manner as in Manufacturing Example A-11 except that the kind and the content of the resin used as the resin precursor and the kind and the content of the material used as the skeleton X are changed as shown in Table A-3.

TABLE A-3

| | X | | Resin precursor | |
|---|---|---|---|---|
| | Kind | Parts by weight | Kind | Parts by weight |
| Resin A-1 | Chemical compound S | 15 | A-1 | 85 |
| Resin A-2 | Chemical compound S | 7 | A-2 | 93 |
| Resin A-3 | Chemical compound S | 2 | A-3 | 98 |
| Resin A-4 | Chemical compound T | 7 | A-2 | 93 |
| Resin A-5 | Chemical compound S | 7 | A-7 | 93 |
| Resin A-6 | Chemical compound S | 7 | A-8 | 93 |
| Resin A-7 | Chemical compound S | 7 | A-10 | 93 |

Manufacturing Example A-10

Synthesis of Resin Precursor A-10

The resin precursor A-10 is manufactured in the same manner as in Manufacturing Example A-2 except that lactide is changed to ε caprolactone.

The molecular weight (Mn) of the obtained resin precursors A-1 to A-10 are shown in Table A-2.

TABLE A-2

| | Polyhydroxycarboxylic acid skeleton | Molecular weight (Mn) | Initiator |
|---|---|---|---|
| Resin precursor A-1 | PLA | 1,000 | Cholesterol |
| Resin precursor A-2 | PLA | 2,500 | Cholesterol |
| Resin precursor A-3 | PLA | 20,000 | Cholesterol |
| Resin precursor A-4 | PLA | 1,500 | Compound P |
| Resin precursor A-5 | PCL | 2,500 | Compound P |
| Resin precursor A-6 | PLA | 10,000 | Compound P |
| Resin precursor A-7 | PCL | 2,500 | Compound Q |
| Resin precursor A-8 | PLA | 2,500 | Compound R |
| Resin precursor A-9 | PLA | 10,000 | Lauryl alcohol |
| Resin precursor A-10 | PCL | 2,500 | Cholesterol |

* PLA = polylactic acid
PCL = poly ε caprolactone

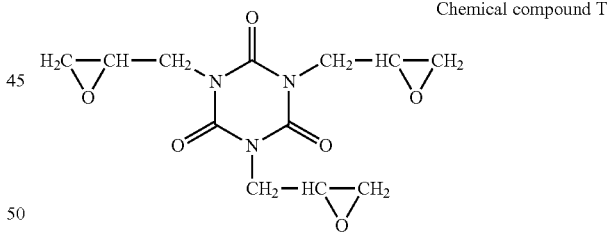

Chemical compound T

Manufacturing Example A-11

Synthesis of Resin A-1

Place 85 parts by weight of the resin precursor A-1 in a flask and raise the temperature of the system. After confirming the system has become uniform by naked eyes, dehydrate the system under a reduced pressure. Thereafter, maintain the temperature of the system at 150° C. and add 15 parts by weight of the Chemical compound S represented by the following chemical structure and 0.20 parts by weight of tin 2-ethylhexonate to conduct reaction to obtain a Resin A-1.

Manufacturing Example A-18

Synthesis of Resin A-8

Place 89 parts by weight of the resin precursor A-2 in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 8 parts by weight of isophorone diisocyanate to conduct reaction while maintaining the temperature of the system at 80° C. Thereafter, add 3 parts by weight of the Chemical compound P to obtain a Resin A-8.

Manufacturing Example A-19

Synthesis of Resin A-9

Place 139 parts by weight of the Resin precursor A-1 in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 3 parts by weight of isophorone diisocyanate to conduct reaction while maintaining the temperature of the system at 80° C. Thereafter, add 58 parts by weight of the Resin precursor A-4 to obtain a Resin A-9.

Manufacturing Example A-20

Synthesis of Resin A-10

Place 81 parts by weight of the resin precursor A-5 in a flask and raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 7 parts by weight or isophorone diisocyanate to conduct reaction while maintaining the temperature of the system at 80° C. Thereafter, add 12 parts by weight of the cholesterol to conduct reaction to obtain a Resin A-10.

Manufacturing Example A-21

Synthesis of Resin A-11

Place 89 parts by weight of the resin precursor A-2 in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 8 parts by weight of isophorone diisocyanate to conduct reaction while maintaining the temperature of the system at 80° C. Thereafter, add 3 parts by weight of bis(2-hydroxyethyl terephthalate) to obtain a Resin A-11.

Manufacturing Example A-22

Synthesis of Resin A-12

Place 89 parts by weight of the resin precursor A-2 in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 8 parts by weight of isophorone diisocyanate to conduct reaction while maintaining the temperature of the system at 80° C. Thereafter, add 3 parts by weight of the Chemical compound U to obtain a Resin A-12.

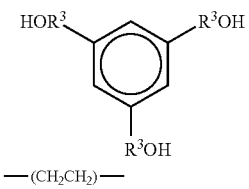

Chemical compound U $R^3$: —($CH_2CH_2$)—

The compositions of X, Y, and Z in the structure of the Resins A-1 to A-9 and A-11 to A-12 are as shown in Table A-4. In addition, the schematic diagrams of the Resins A-1 to A-12 are illustrated in FIG. 1.

TABLE A-4

| | X | Y | Z |
|---|---|---|---|
| Resin A-1 | Chemical compound S | PLA (Mn = 1,000) | Cholesterol |
| Resin A-2 | Chemical compound S | PLA (Mn = 2,500) | Cholesterol |
| Resin A-3 | Chemical compound S | PLA (Mn = 20,000) | Cholesterol |
| Resin A-4 | Chemical compound T | PLA (Mn = 2,500) | Cholesterol |
| Resin A-5 | Chemical compound S | PLA (Mn = 2,500) | Compound Q |
| Resin A-6 | Chemical compound S | PLA (Mn = 2,500) | Compound R |
| Resin A-7 | Chemical compound S | PCL (Mn = 2,500) | Cholesterol |
| Resin A-8 | Chemical compound P + IPDI | PLA (Mn = 2,500) | Cholesterol |
| Resin A-9 | Resin Precursor A-4 + IPDI | PLA (Mn = 1000) | Cholesterol |
| Resin A-11 | BHET + IPDI | PLA (Mn = 2,500) | Cholesterol |
| Resin A-12 | Chemical compound U + IPDI | PLA (Mn = 2,500) | Cholesterol |

* PLA = polylactic acid
IPDI = isophorone diisocyanate
BHET = bis(2-hydroxyethyl)terephthalate The properties of the obtained Resins A-1 to A-12 are as shown in Table A-5.

TABLE A-5

| | Number average molecular weight (Mn) | Optical purity | Glass transition temperature (Tg: ° C.) | Softening point (° C.) | Solubility in organic solvent |
|---|---|---|---|---|---|
| Resin A-1 | 3,500 | 70 | 54 | 105 | Soluble |
| Resin A-2 | 8,000 | 70 | 53 | 110 | Soluble |
| Resin A-3 | 30,000 | 70 | 51 | 118 | Soluble |
| Resin A-4 | 8,000 | 70 | 52 | 108 | Soluble |
| Resin A-5 | 8,000 | 70 | 52 | 108 | Soluble |
| Resin A-6 | 8,000 | 70 | 52 | 107 | Soluble |
| Resin A-7 | 8,000 | 70 | 51 | 106 | Soluble |
| Resin A-8 | 8,500 | 70 | 55 | 113 | Soluble |
| Resin A-9 | 8,500 | 70 | 57 | 115 | Soluble |
| Resin A-10 | 8,500 | 70 | 59 | 117 | Soluble |
| Resin A-11 | 5,500 | 70 | 56 | 107 | Soluble |
| Resin A-12 | 5,500 | 70 | 55 | 106 | Soluble |

Example A-1

Manufacturing of Toner A-1

Synthesis of Master Batch A-1

Mix the raw materials shown in Table A-6 by a HENSCHEL MIXER to obtain a mixture in which water penetrates in a pigment agglomeration body.

The mixture is mixed and kneaded for 45 minutes by two rolls where the temperature of the surface is set at 130° C. and pulverized by a pulverizer to the size of 1 mm φ. Thus, a Master batch A-1 is obtained.

TABLE A-6

Master batch A-1 composition

| Pigment: C.I. Pigment Yellow 185 | 40 parts |
| Resin A-1 | 60 parts |
| Water | 30 parts |

Admix and knead carnauba wax (molecular weight: 1,800, acid value: 2.7 mgKOH/g, penetration degree: 1.7 mm at 40° C.), the master batch, a charge control agent (E-84, manufactured by Orient Chemical Industries Co., Ltd.) prescribed as shown in Table A-7 by a two-axis extruder followed by pulverization and classification to obtain toner particles. Next, mix 0.5 parts by weight of hydrophobic silica and 0.5 parts by weight of hydrophobic titanium oxide with 100 parts by weight of the toner particles by a HENSCHEL MIXER to obtain a Toner A-1.

TABLE A-7

Toner A-1 composition

| Resin A-1 | 90 parts |
| Carnauba wax | 4 parts |
| Master batch A-1 | 5 parts |
| Charge control agent | 1 part |

Examples A-2 and A-12

Manufacturing of Toners A-2 to A-12

Toners A-2 to A-12 are manufactured in the same manner as in Example A-1 except that the kind of the resin is changed as shown in Table A-8.

Example A-13

Preparation of Liquid Dispersion of Resin Particulate

Place and heat 180 parts of the Resin A-1 and 585 parts of dehydrated water in a beaker in a hot bath to 95° C. When the Resin A-1 is dissolved, stir the solution by a Homogenizer (ULTRA-TURRAX T50, manufactured by IKA) at 8,000 rpm and add diluted ammonia water thereto at the same time to adjust pH to be 7.0.

Drop 20 parts of an aqueous solution in which 0.8 parts of an anionic surface active agent (NEOGEN R, manufactured by Dai-Ichi Kogyo Seiyaku Co., Ltd.) is diluted to the solution to conduct emulsification dispersion to prepare a liquid dispersion of resin particulate A-12 (resin particulate density: 12.4%).

Preparation of Liquid Dispersion of Black Coloring Agent

Mix 99 parts of Carbon Black Regal 330 (manufactured by Cabot Corporation), 15 parts of an anionic surface active agent (NEOGEN R, manufactured by Dai-Ichi Kogyo Seiyaku Co., Ltd.), and 300 parts of deionized water followed by dispersion by a Homogenizer (ULTRA-TURRAX T50, manufactured by IKA) for ten minutes, place the resultant in a circulation type ultrasonic disperser (RUS_600 TCVP, manufactured by Nissei Corporation) to obtain a liquid dispersion of black coloring agent.

Preparation of Liquid Dispersion of Releasing Agent

Mix 100 parts of Fischer-Tropsch Wax FNP 92 (melting point: 92° C., manufactured by Nippon Seiro Co., Ltd.), 3.6 parts of an anionic surface active agent (NEOGEN R, manufactured by Dai-Ichi Kogyo Seiyaku Co., Ltd.), and 400 parts of deionized water followed by heating to 100° C. and disperse the resultant sufficiently by a Homogenizer (ULTRA-TURRAX T50, manufactured by IKA) followed by dispersion treatment by a discharge pressure type Gaulin Homogenizer to obtain a liquid dispersion of a releasing agent.

Manufacturing of Toner A-13

Place 105 parts of the liquid dispersion of resin particulate A-12, 45 parts of the liquid dispersion of black coloring agent, 115 parts of the liquid dispersion of a releasing agent, and 402 parts of deionized water in a flask followed by mixing and dispersing by an ULTRA-TURRAX T50.

Next, add 0.37 parts of aluminum polychloride thereto and continue the dispersion by the ULTRA-TURRAX. Heat the resultant in an oil bath for heating to 52° C. while stirring the flask. Thereafter, set pH in the system to be 8.5 by 0.5N aqueous solution of sodium hydroxide, seal the flask, heat the system to 90° C. while keeping stirring by using a magnetic seal, and maintain the state for three hours.

After completion of the reaction, subsequent to cooling down and filtration, wash the system with deionized water sufficiently and separate the liquid from the solid by Nutsche suction filtration.

Re-disperse the resultant in 3 litters of deionized water at 40° C. and stir and wash it at 300 rpm for 15 minutes. Repeat this process five times and to obtain the filtered liquid having a pH of 7.00, an electric conductivity of 8.7 µS/cm, and a surface tension of 7.08 Nm. Separate the liquid from the solid by Nutsche suction filtration by using a No. 5A filter paper followed by a vacuum drying for 12 hours to obtain a Mother toner particle A-13.

1.5 parts of hydrophobic silica (TS720, manufactured by Cabot Corporation) is added to 100 parts of the Mother toner particle followed by blending by a HENSCHEL MIXER at 3,000 rpm for five minutes to obtain a Toner A-13.

Examples A-14 and A-15

Manufacturing of Toners A-14 and A-15

Toners A-14 and A-15 are manufactured in the same manner as in Example A-13 except that the resin is changed to Resins A-2 and A-3.

Example A-16

Preparation of Aqueous Medium A-1

Dissolve 0.2 parts of dodecylbenzene sodium sulfonate in 300 pasts of an aqueous medium by mixing and stirring to prepare an Aqueous medium A-1.

Preparation of Master Batch A-1

Mix 1,000 parts of water, 530 parts of carbon black (Printex 35 from Degussa AG, which has a dibutyl phthalate (DBP) oil absorption of 42 ml/100 g and has a PH of 9.5), and 1,200 parts of the Resin A-1 are admixed by a HENSCHEL MIXER (manufactured by Nippon Coke & Engineering Co., Ltd.).

Mix and knead the mixture at 150° C. for 30 minutes using a two-roll mill followed by rolling and cooling down. Thereafter, pulverize the kneaded mixture by a pulverizer (manufactured by Hosokawa Micron Group) to prepare Master batch A-1.

Manufacturing of Toner A-16

Add and stir 100 parts of the Resin A-1 and 50 parts of ethylacetate in a reaction container to prepare a resin solution.

Place 5 parts of carnauba wax (molecular weight: 1,800, acid value: 2.7 mgKOH/g, penetration level: 1.7 mm at 40° C.) and 5 parts of the master batch A-1 in the resin solution and the resultant is dispersed using a bead mill (ULTRAVIS-COMILL from AIMEX) under the following conditions:

Liquid feeding speed: 1 kg/hr

Disc rotation speed: 6 m/sec

Diameter of zirconia beads: 0.5 mm

Filling factor: 80% by volume

Number of dispersion treatment: 3 times.

Place 150 parts of the Aqueous medium A-1 in the reaction container and add 100 parts of a toner liquid material thereto while mixing by stirring at 12,000 rpm by a T. K. Homomixer (manufactured by Tokushu Kika Kogyo Co., Ltd.) for ten minutes to obtain an Emulsified slurry A-1.

Furthermore; place 100 parts of the emulsified slurry in a flask equipped with a stirrer and a thermometer and remove the solvent at 30° C. for ten hours while stirring at a stirring peripheral speed of 20 m/min. to obtain a dispersed slurry A-1.

After filtrating 100 parts of the dispersed slurry A-1 with a reduced pressure, add 100 parts of deionized water to the obtained filtered cake followed by mixing by a TK Homomixer at 12,000 rpm for ten minutes and filtration.

After adding 300 parts of deionized water to the obtained filtered cake, mix the resultant by a TK Homomixer at 12,000 rpm for ten minutes. This filtration is repeated twice. Admix 20 parts of aqueous solution of 10% by weight of sodium hydroxide to the obtained filtered cake using a TK Homomixer at 12,000 rpm for 30 minutes followed by filtration with a reduced pressure. After adding 300 parts of deionized water to the obtained filtered cake, mix the resultant by a TK Homomixer at 12,000 rpm for ten minutes followed by filtration. After adding 300 parts of deionized water to the obtained filtered cake, mix the resultant by a TK Homomixer at 12,000 rpm for ten minutes. This filtration is repeated twice. Admix 20 parts by weight of 10 weight % hydrochloric acid to the obtained filtered cake by a TK Homomixer at 12,000 rpm for ten minutes and add fluorinated quaternary ammonium chloride (FUTARGENT F-310, manufactured by Neos Company Limited) by 5% methanol solution to the mixture in such a manner that that the fluorinated quaternary ammonium chloride is 0.1 parts to 100 parts of the solid portion of toner followed by a ten minute stirring and thereafter filtration.

After adding 300 parts of deionized water to the obtained filtered cake, mix the resultant by a TK Homomixer at 12,000 rpm for ten minutes. This filtration is repeated twice to obtain a filtered cake.

Dry the obtained filtered cake at 40° C. for 36 hours using a circulation dryer followed by screening with a mesh having an opening of 75 μm to manufacture a Mother toner particle A-16.

Thereafter, a Toner A-16 is manufactured from the Mother toner particle A-16 in the same manner as in Example A-13.

Examples A-17 and A-18

Manufacturing of Toners A-17 and A-18

Toners A-17 and A-18 are manufactured in the same manner as in Example A-16 except that the resin is changed to Resins A-2 and A-3.

Example A-19

Manufacturing of Aqueous Liquid Dispersion of Resin Particulate A-1

The following recipe is placed in a container equipped with a stirrer and a thermometer and stirred at 400 rpm for 20 minutes to obtain a white emulsion:

Water: 600 parts

Styrene: 120 parts

Methacrylic acid: 100 parts

Butyl acrylate: 45 parts

Alkyl aryl sodium sulfosuccinate (EREMINOR JS-2, manufactured by Sanyo Chemical Industries, Ltd.): 10 parts Ammonium persulfate: 1 part.

Heat the system to 75° C. to continue the reaction for six hours.

Add 30 parts of aqueous solution of 1% ammonium persulfate thereto and age the resultant at 75° C. for six hours to obtain a Liquid dispersion A-1 of particulate (i.e., an aqueous liquid solution) of a vinyl resin (copolymer of styrene-metahcrylic acid-butyl methacrylate-alkyl aryl sodium sulfosuccinate).

The volume average particle diameter of the Liquid dispersion A-1 of particulate measured by ELS-800 is 0.08 μm.

Isolate the resin portion by drying part of the Liquid dispersion A-1 of particulate. The glass transition temperature of the resin portion is 74° C. by a flow tester measuring.

Preparation of Aqueous Medium A-2

Prepare an aqueous medium b by uniformly dissolving 0.2 parts of dodecyl benzene sodium sulfonate and 300 parts of the liquid dispersion A-2 of particulate in 300 parts of deionized water by mixing and stirring.

Synthesis of Polyester Prepolymer

The following recipe is placed in a container equipped with a condenser, a stirrer, and a nitrogen introducing tube to conduct a reaction at 230° C. for eight hours under normal pressure followed by another reaction for seven hours with a reduced pressure of 10 to 15 mmHg to obtain an intermediate polyester resin:

Adduct of bisphenol A with 2 mole of ethylene oxide: 720 parts

Adduct of bisphenol A with 2 mole of propylene oxide: 0.90 parts

Terephthalic acid: 290 parts

Trimellitic anhydride: 25 parts

Dibutyl tin oxide: 2 parts.

The obtained intermediate polyester resin has a number average molecular weight (Mn) of 2,500, and a weight average molecular weight (Mw) of 10,700, a peak molecular weight of 3,400, a glass transition temperature of 57° C., an acid value of 0.4 mgKOH/g, and a hydroxyl value of 49 mgKOH/g.

Next, 400 parts of the Intermediate polyester resin, 95 parts of isophorone diisocyanate, and 580 parts of ethyl acetate are placed in a reaction container equipped with a condenser, stirrer, and a nitrogen introducing tube to conduct reaction at 100° C. for eight hours to prepare a polyester prepolymer.

The obtained polyester prepolymer has an isolated isocyanate of 1.42% by weight.

Preparation of Master Batch A-2

Mix 1,000 parts of water, 530 parts of carbon black (Printex 35 from Degussa AG, which has a dibutyl phthalate (DBP) oil absorption of 42 ml/100 g and has a PH of 9.5), and 1,200 parts of the Resin A-1 are admixed by a HENSCHEL MIXER (manufactured by Nippon Coke & Engineering Co., Ltd.).

Mix and knead the mixture at 150° C. for 30 minutes using a two-roll mill followed by rolling and cooling down. Thereafter, pulverize the kneaded mixture by a pulverizer (manufactured by Hosokawa Micron Group) to prepare a Master batch A-2.

Synthesis of Ketimine Compound

Place 30 parts of isophoronediamine and 70 parts of methyl ethyl ketone in a reaction container equipped with a stirrer and a thermometer to conduct reaction at 50° C. for five hours to obtain a Ketimine compound.

The obtained ketimine has an amine value of 423 mgKOH/g.

Manufacturing of Toner A-19

Add and stir 100 parts of the Resin A-1, 30 parts of the polyester prepolymer, and 80 parts of ethylacetate in a reaction container to obtain a resin solution.

Place 5 parts of carnauba wax (molecular weight: 1,800, acid value: 2.7 mgKOH/g, penetration level: 1.7 mm at 40° C.) and 5 parts of the master batch in the resin solution and disperse the resultant using a bead mill (ULTRAVISCOMILL from AIMEX) under the following conditions:

Liquid feeding speed: 1 kg/hr
Disc rotation speed: 6 m/sec
Diameter of zirconia beads: 0.5 mm
Filling factor: 80% by volume
Number of dispersion treatment: 3 times.

Furthermore, add and dissolve 2.5 parts of the ketimine compound in the resultant to obtain a toner liquid material.

Place 150 parts of the aqueous medium in the reaction container and add 100 parts of the toner liquid material thereto while stirring and mixing at 12,000 rpm by a T. K. Homomixer (manufactured by Tokushu Kika Kogyo Co., Ltd.) for ten minutes to obtain an Emulsified slurry A-2.

Furthermore, place 100 parts of the Emulsified slurry A-2 in a flask equipped with a stirrer and a thermometer and remove the solvent at 30° C. for ten hours while stirring at a stirring peripheral speed of 20 m/min. to obtain the Dispersed slurry A-2.

After filtrating 100 parts of the Dispersed slurry A-2 with a reduced pressure, add 100 parts of deionized water to the obtained filtered cake followed by mixing by a TK Homomixer at 12,000 rpm for ten minutes and filtration.

After adding 300 parts of deionized water to the obtained filtered cake, mix the resultant by a TK Homomixer at 12,000 rpm for ten minutes. This filtration is repeated twice. Admix 20 parts of aqueous solution of 10% by weight of sodium hydroxide to the obtained filtered cake using a TK Homomixer at 12,000 rpm for 30 minutes followed by filtration with a reduced pressure.

After adding 300 parts of deionized water to the obtained filtered cake, mix the resultant by a TK Homomixer at 12,000 rpm for ten minutes followed by filtration.

After adding 300 parts of deionized water to the obtained filtered cake, mix the resultant by a TK Homomixer at 12,000 rpm for ten minutes. This filtration is repeated twice. Admix 20 parts by weight of 10 weight % hydrochloric acid to the obtained filtered cake by a TK Homomixer at 12,000 rpm for ten minutes and add fluorinated quaternary ammonium chloride (FUTARGENT F-310, manufactured by Neos Company Limited) by 5% methanol solution to the mixture in such a manner that that the fluorinated quaternary ammonium chloride is 0.1 parts to 100 parts of the solid portion of toner followed by a ten minute stirring and thereafter filtration.

After adding 300 parts of deionized water to the obtained filtered cake, mix the resultant by a TK Homomixer at 12,000 rpm for ten minutes. This filtration is repeated twice to obtain a filtered cake.

Dry the obtained filtered cake at 40° C. for 36 hours using a circulation dryer followed by screening with a mesh having an opening of 75 μm to manufacture a Mother toner particle A-19.

Thereafter, a Toner A-19 is manufactured from the Mother toner particle A-19 in the same manner as in Example A-13.

Examples A-20 and A-21

Manufacturing of Toners A-20 and A-21

Toners A-20 and A-21 are manufactured in the same manner as in Example A-19 except that the resin is changed to Resins A-2 and A-3.

Comparative Examples A-1 and A-2

Manufacturing of Toners A-22 and A-23

Toners A-22 and A-23 are manufactured in the same manner as in Example A-19 except that the resin is changed to the Resin precursors A-6 and A-9.

The combinations of the toner and resin are shown in Table A-8.

TABLE A-8

|  | Toner | Resin |
|---|---|---|
| Example A-1 | Toner A-1 | Resin A-1 |
| Example A-2 | Toner A-2 | Resin A-2 |
| Example A-3 | Toner A-3 | Resin A-3 |
| Example A-4 | Toner A-4 | Resin A-4 |
| Example A-5 | Toner A-5 | Resin A-5 |
| Example A-6 | Toner A-6 | Resin A-6 |
| Example A-7 | Toner A-7 | Resin A-7 |
| Example A-8 | Toner A-8 | Resin A-8 |
| Example A-9 | Toner A-9 | Resin A-9 |
| Example A-10 | Toner A-10 | Resin A-10 |
| Example A-11 | Toner A-11 | Resin A-11 |
| Example A-12 | Toner A-12 | Resin A-12 |
| Example A-13 | Toner A-13 | Resin A-1 |
| Example A-14 | Toner A-14 | Resin A-2 |
| Example A-15 | Toner A-15 | Resin A-3 |
| Example A-16 | Toner A-16 | Resin A-1 |
| Example A-17 | Toner A-17 | Resin A-2 |
| Example A-18 | Toner A-18 | Resin A-3 |
| Example A-19 | Toner A-19 | Resin A-1 |
| Example A-20 | Toner A-20 | Resin A-2 |
| Example A-21 | Toner A-21 | Resin A-3 |
| Comparative Example A-1 | Toner A-22 | Resin precursor A-6 |
| Comparative Example A-2 | Toner A-23 | Resin precursor A-9 |

The obtained toners are evaluated with regard to the fixing property and the high temperature preservation property according to the evaluation methods and criteria described later and the evaluation results are shown in Table E-1.

Manufacturing of Carrier A

The following recipe is added to 100 parts of toluene followed by dispersion by a Homomixer for 20 minutes to prepare a liquid application of a resin layer.

Silicone resin (Organostraight silicone): 100 parts
γ-(2-aminoethyl)amino propyl trimethoxy silane: 5 parts
Carbon black: 10 parts Apply the liquid application of a resin layer to the surface of 1,000 parts of spherical magnetite having a volume average particle diameter of 50 μm using a fluid bed type coating device to manufacture a Carrier A.

Manufacturing of Development Agent

Mix 5 parts of the Toners A-1 to A-23 and 95 parts of the carrier to manufacture development agents of Examples A-1 to A-23.

The obtained development agents are evaluated with regard to the fixing property and the high temperature preservation property according to the evaluation methods and criteria described later and the evaluation results are shown in Table E-1.

Measuring Method of Properties of Component Used in Examples B-1, B-3 to B7, and B9

Measuring of Molecular Weight and Amount of Remaining Monomer

Device: GPC (manufactured by Toso Corporation)
Detector: RI
Measuring Temperature: 40° C.
Transfer Phase: tetrahydrofuran
Flowing Amount: 0.45 ml/min.

Molecular weights Mn and Mw and molecular weight distribution Mw/Mn are the number average molecular weight, the weight average molecular weight, and the molecular weight distribution, respectively, which are measured by gel permeation chromatography (GPC) referring to the standard curve made from a polystyrene sample the molecular weight of which is known.

Measuring of Contact Angle with Water

Device: Automatic contact angle measuring device: DM-301, manufactured by Kyowa Interface Science Co., Ltd.)

Dissolve the synthesized resin in ethyl acetate and measure 75 μl by a pipetter, and thinly and uniformly coat it on a slide glass by a wire bar having a line diameter of 0.3 mm.

After evaporating ethyl acetate in the sample sufficiently, drop 3 μl of pure water from a dispenser of an automatic contact angle measuring device and calculate the contact angle by a θ/2 method after the droplet stands still on the sample. A set of measuring the contact angle once for dropping of pure water once is repeated five times and define the average of the obtained contact angles as the static contact angle of the resin to water.

Measuring of Glass Transition Temperature (Tg)

Device: DSC (Q2000, manufactured by TA instruments)

Fill a sample of 5 mg to 10 mg in a simple aluminum sealed pan for the following measuring flow.

First heating: 30° C. to 220° C., temperature rising speed: 5° C./min., one minute maintained after 220° C.

Cooling down: Quench to −20° C. without temperature control, one minute maintained after −20° C.

Second heating: −20° C. to 180° C., temperature rising speed: 5° C./min.

The glass transition temperature is read by a mid point method in the thermogram in the second heating.

Measuring of 90% RH Thermal Distortion Temperature

Device: TMA (EXSTAR 7000, manufactured by SII Nano-Technology Inc.)

Fill a sample of 5 mg to 10 mg in a die having a φ of 3 mm and a thickness of 1 mm and mold it to form a tablet by compression by a hand press for measuring. Use the temperature/moisture controller attached to the device to track the transition of the sample under the condition in which the temperature is increased from 30° C. to 90° C. at an increasing speed of 2° C./min. at 90% RH followed by a pressure of 100 mN using a standard probe. The peak top in the obtained thermogram is defined as 90% RH thermal distortion temperature and the sample is evaluated.

Manufacturing Example B-1

Synthesis of Resin B-A

Place 85.0 parts by weight of L-lactide, 15.0 parts by weight of D-lactide, and 8 parts by weight of cholesterol as an initiator, gradually raise the temperature of the system, and dehydrate it under a reduced pressure. Next, raise the temperature furthermore under purging of $N_2$, confirm the system has become uniform by naked eyes, and place 0.03 parts by weight of tin 2-ethyl hexanoate to conduct polymerization reaction.

The temperature in the system is controlled not to be higher than 190° C. After a two-hour reaction, the system is switched to an outflow line again to remove non-reacted lactide under a reduced pressure environment and complete the polymerization reaction to obtain a resin B-A.

Manufacturing Examples B-2 to B-6

Synthesis of Resin B-B to B-F

The resins B-B to B-F of the Manufacturing Examples B-2 to B-6 are manufactured in the same manner as in Manufacturing Example B-1 except that the kind and the content of the initiator are changed as shown in Table B-1. The Chemical compound P is represented as follows:

TABLE B-1

| Resin | Initiator Kind | Initiator Content (parts by weight) | L-lactide Content (parts by weight) | D-lactide Content (parts by weight) | ε caprolactone Content (parts by weight) |
|---|---|---|---|---|---|
| Resin B-A | Cholesterol | 8 | 85 | 15 | 0 |
| Resin B-B | Cholesterol | 18 | 85 | 15 | 0 |
| Resin B-C | Cholesterol | 8 | 76.5 | 13.5 | 10 |
| Resin B-D | Cholesterol | 8 | 60 | 40 | 0 |

TABLE B-1-continued

| Resin | Initiator Kind | Initiator Content (parts by weight) | L-lactide Content (parts by weight) | D-lactide Content (parts by weight) | ε caprolactone Content (parts by weight) |
|---|---|---|---|---|---|
| Resin B-E | Chemical compound P | 4 | 60 | 40 | 0 |
| Resin B-F | 2,3,4,5-pentafluoro benzyl alcohol | 12 | 85 | 15 | 0 |

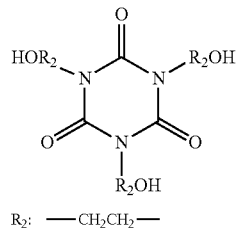

Chemical compound P $R_2$: —$CH_2CH_2$—

Manufacturing Example B-7

Synthesis of Resin B-1

Place 97 parts by weight of the resin B-A in a flask and gradually raise the temperature of the system. After confirming the system has become uniform by naked eyes, dehydrate the system under a reduced pressure. Thereafter, maintain the temperature of the system at 150° C. and add 3 parts by weight of the Chemical compound S represented by the following chemical structure and 0.20 parts by weight of tin 2-ethylhexonate to conduct reaction to obtain a Resin B-1.

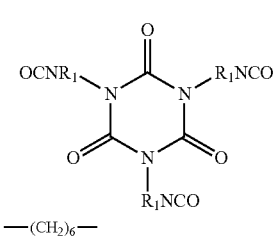

Chemical compound S $R_1$: —$(CH_2)_6$—

Manufacturing Example B-9

Synthesis of Resin B-3

Place 88 parts by weight of the resin B-B in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 8 parts by weight of isophorone diisocyanate to conduct reaction while maintaining the temperature of the system at 80° C. Thereafter, add 4 parts by weight of bis(2-hydroxyethyl)terephthalate to obtain a Resin B-3

Manufacturing Example B-10

Synthesis of Resin B-4

Place 94 parts by weight of the resin B-C in a flask and gradually raise the temperature of the system. After confirming the system has become uniform by naked eyes, dehydrate the system under a reduced pressure. Thereafter, add ethyl acetate to the system to be 50% by weight, 0.2 parts by weight of tin 2-ethylhexonate, and 4 parts by weight of isophorone diisocyanate to conduct reaction while maintaining the temperature of the system at 80° C. Thereafter, add 2 parts by weight of the Chemical compound P to obtain a Resin B-4.

Manufacturing Example B-11

Synthesis of Resin B-5

Place 94 parts by weight of the resin B-A in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 4 parts by weight of isophorone diisocyanate to conduct reaction while maintaining the temperature of the system at 80° C. Thereafter, add 2 parts by weight of the Chemical compound p to obtain a Resin B-5.

Manufacturing Example B-12

Synthesis of Resin B-6

Place 94 parts by weight of the resin B-D in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 4 parts by weight of isophorone diisocyanate to conduct reaction while maintaining the temperature of the system at 80° C. Thereafter, add 2 parts by weight of the Chemical compound P to obtain a Resin B-6.

Manufacturing Example B-13

Synthesis of Resin B-7

Place 48 parts by weight of the resin B-B in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 4 parts by weight of isophorone diisocyanate to conduct reaction while maintaining the temperature of the system at 80° C. Thereafter, add 48 parts by weight of the resin B-E to obtain a Resin B-7.

The properties of the obtained Resins B-1 and B-3 to B-7 are as shown in Table B-2.

TABLE B-2

| Resin | Contact angle against water (° C.) | Glass transition temperature Tg (° C.) | 90% RH heat thermal distortion (° C.) | Solublility in organic solvent |
|---|---|---|---|---|
| B-1 | 74.3 | 54 | 50 | Soluble |
| B-3 | 78.4 | 59 | 55 | Soluble |
| B-4 | 76.1 | 58 | 54 | Soluble |
| B-5 | 76.9 | 59 | 55 | Soluble |
| B-6 | 73.1 | 57 | 54 | Soluble |
| B-7 | 73.6 | 61 | 57 | Soluble |

Examples B-1 and B-3 to B-7

Manufacturing of Toners B-1 and B-3 to B-7

Preparation of Master Batch B-1

Mix the raw materials shown in Table B-3 by a HENSCHEL MIXER to obtain a mixture in which water is penetrated in a pigment agglomeration body.

Mix and knead the mixture for 45 minutes by two rolls where the temperature of the surface is set at 130° C. and pulverize the resultant by a pulverizer to the size of 1 mm φ to obtain a Master batch B-1. The resins for use in the Toners B-1 and B-3 to B-7 are as shown in Table B-4.

TABLE B-3

| Master batch B-1 composition | |
|---|---|
| Pigment: C.I. Pigment Yellow | 40 parts |
| Resins B-1 and B-3 to B-7 | 60 parts |
| Water | 30 parts |

TABLE B-4

| | Toner | Resin |
|---|---|---|
| Example B-1 | Toner B-1 | Resin B-1 |
| Example B-3 | Toner B-3 | Resin B-3 |
| Example B-4 | Toner B-4 | Resin B-4 |
| Example B-5 | Toner B-5 | Resin B-5 |
| Example B-6 | Toner B-6 | Resin B-6 |
| Example B-7 | Toner B-7 | Resin B-7 |

Admix and knead each of resins B-1 and B-3 to B-7, carnauba wax (molecular weight: 1,800, acid value: 2.7 mgKOH/g, penetration degree: 1.7 mm at 40° C.) and the Master batch B-1, a charge control agent (E-84, manufactured by Orient Chemical Industries Co., Ltd.) prescribed as shown in Table B-5 by using a two-axis extruder followed by pulverization and classification to obtain respective mother toner particles.

Next, mix 100 parts by weight of each of the mother toner particles, 0.5 parts by weight of hydrophobic silica, and 0.5 parts by weight of hydrophobic titanium oxide by a HENSCHEL MIXER (manufactured by Nippon Coke & Engineering Co., Ltd.) to obtain Toners B-1 and B-3 to B-7.

TABLE B-5

| Toner A-1 composition | |
|---|---|
| Resins B-1 and B-3 to B-7 | 90 parts |
| Carnauba wax | 4 parts |
| Master batch B-1 | 5 parts |
| Charge control agent | 1 part |

Example B-9

Manufacturing of Toner B-9

Preparation of Master Batch B-2

Mix 37 parts of water, 19 parts of carbon black (Printex 35 from Degussa AG, which has a dibutyl phthalate (DBP) oil absorption of 42 ml/100 g and has a PH of 9.5), and 44 parts of the Resin B-1 by a HENSCHEL MIXER.

Mix and knead the mixture at 150° C. for 30 minutes using a two-roll mill followed by rolling and cooling down. Thereafter, pulverize the kneaded mixture by a pulverizer (manufactured by Hosokawa Micron Group) to prepare a Master batch B-2. A mixture of the Resin B-1 is used in Example B-9.

TABLE B-6

| Master batch B-2 | |
|---|---|
| Blended compositions | Content (parts by weight) |
| Carbon black (Pigment) | 19 parts |
| Resin B-1 | 44 parts |
| Water | 37 parts |

Preparation of Liquid Dispersion of Resin Particulate

The following recipe is placed in a container equipped with a stirrer and a thermometer and stirred at 400 rpm for 20 minutes to obtain a white emulsion:

Water: 600 parts

Styrene: 120 parts

Methacrylic acid: 100 parts

Butyl acrylate: 45 parts

Alkyl aryl sodium sulfosuccinate (EREMINOR JS-2, manufactured by Sanyo Chemical Industries, Ltd.): 10 parts Ammonium persulfate: 1 part.

Heat the system to 75° C. to continue the reaction for six hours.

Add 30 parts of aqueous solution of 1% ammonium persulfate thereto and age the resultant at 75° C. for six hours to obtain a liquid dispersion B of particulate (i.e., an aqueous liquid solution) of a vinyl resin (copolymer of styrene-metahcrylic acid-butyl methacrylate-alkyl aryl sodium sulfosuccinate).

The volume average particle diameter of the liquid dispersion B of particulate measured by ELS-800 is 0.08 μm.

Isolate the resin portion by drying part of the liquid dispersion B of particulate. The glass transition temperature of the resin portion is 74° C. by a flow tester measuring.

Preparation of Aqueous Medium

Prepare an aqueous medium by uniformly dissolving 300 parts of dodecyl benzene sodium sulfonate and 0.2 parts of the liquid dispersion B of particulate in 300 parts of deionized water by mixing and stirring.

Preparation of Liquid Dispersion of Resin Particulate

Add and stir the resin and the polyester prepolymer prescribed as in Table B-7 and 80 parts of ethylacetate in a reaction container to obtain Resin solution B-1.

TABLE B-7

| | | | Resin | | Polyester prepolymer |
|---|---|---|---|---|---|
| | | | Kind | Parts | Parts |
| Example B-9 | Toner B-9 | Resin solution B-1 | Resin B-1 | 100 | 0 |

Preparation of Oil Phase

Place 5 parts of carnauba wax (molecular weight: 1,800, acid value: 2.7 mgKOH/g, penetration level: 1.7 mm at 40° C.) and 5 parts of the master batch B-2 in 400 parts of the resin solution B-1 and disperse the resultant using a bead mill (ULTRAVISCOMILL from AIMEX) under the following conditions to obtain an Oil phase B-1:

Liquid feeding speed: 1 kg/hr
Disc rotation speed: 6 m/sec
Diameter of zirconia beads: 0.5 mm
Filling factor: 80% by volume
Number of dispersion treatment: 3 times.

Preparation of Toner

Place 150 parts of the aqueous medium phase in another reaction container and admix 100 parts of the Oil phase B-1 thereto while stirring by a T.K. Homomixer (manufactured by Tokushu Kika Kogyo Co., Ltd.) at 12,000 rpm by for ten minutes to obtain an Emulsified slurry B-1. Furthermore, place 100 parts of the emulsified slurry in a flask equipped with a stirrer and a thermometer and remove the solvent at 30° C. for ten hours while stirring at a stirring peripheral speed of 20 m/min. to obtain a Dispersed slurry B-1.

After filtrating 100 parts of the Dispersed slurry B-1 with a reduced pressure, add 100 parts of deionized water to the obtained filtered cake followed by mixing by a TK Homomixer at 12,000 rpm for ten minutes and thereafter filtration.

After adding 300 parts of deionized water to the obtained filtered cake, mix the resultant by a TK Homomixer at 12,000 rpm for ten minutes. This filtration is repeated twice. Admix 10 parts of aqueous solution of 10% by weight of sodium hydroxide to the obtained filtered cake using a TK Homomixer at 12,000 rpm for 30 minutes followed by filtration with a reduced pressure.

After adding 300 parts of deionized water to the obtained filtered cake, mix the resultant by a TK Homomixer at 12,000 rpm for ten minutes. This filtration is repeated twice to obtain a filtered cake. Dry the obtained filtered cake at 40° C. for 36 hours using a circulation dryer followed by screening with a mesh having an opening of 75 μm to manufacture a Mother toner particles B-9.

External additives are added to the obtained mother toner particles B-9 in the same manner as in the prescription of the Toner B-1 and B-3 to B-7 to manufacture Toner B-9.

After adding 300 parts of deionized water to the obtained filtered cake, mix the resultant by a TK Homomixer at 12,000 rpm for ten minutes. This filtration is repeated twice to obtain a filtered cake. Dry the obtained filtered cake at 40° C. for 36 hours using a circulation dryer followed by screening with a mesh having an opening of 75 μm to manufacture a Mother toner particles B-9 and B-10.

External additives are added to the obtained mother toner particles B-9 and B-10 in the same manner as in the prescription of the Toner B-1 to B-8 to manufacture Toners B-9 and B-10.

Manufacturing of Carrier B

The following recipe is added to 100 parts of toluene followed by dispersion by a Homomixer for 20 minutes to prepare a liquid application of a resin layer.

Silicone resin (Organostraight silicone): 100 parts
γ-(2-aminoethyl)amino propyl trimethoxy silane: 5 parts
Carbon black: 10 parts Apply the liquid application of a resin layer to the surface of 1,000 parts of spherical magnetite having a volume average particle diameter of 50 μm using a fluid bed type coating device to manufacture a Carrier B.

Manufacturing of Development Agent

Mix 5 parts of the Toners B-1, B-3 to B-7, and B-9 and 95 parts of the carrier to manufacture development agents of Examples B-1, B-3 to B-7, and B-9.

The obtained development agents are evaluated with regard to the fixing property and the high temperature preservation property according to the evaluation methods and criteria described later and the evaluation results are shown in Table E-1.

Measuring Method of Properties of Component Used in Examples C-3 to C-5, C-8 to C-10, C-13, and C-15

Measuring of Molecular Weight and Amount of Remaining Monomer

Device: GPC (manufactured by Toso Corporation)
Detector: RI Measuring Temperature: 40° C.
Transfer Phase: tetrahydrofuran
Flowing Amount: 0.45 ml/min.

Molecular weights Mn and Mw and molecular weight distribution Mw/Mn are the number average molecular weight, the weight average molecular weight, and the molecular weight distribution, respectively, which are measured by gel permeation chromatography (GPC) referring to the standard curve made from a polystyrene sample the molecular weight of which is known.

Measuring of 90% RH Thermal Distortion Temperature

Device: TMA (EXSTAR 7000, manufactured by SII Nano-Technology Inc.)

Fill a sample of 5 mg to 10 mg in a die having a φ of 3 mm and a thickness of 1 mm and mold it to form a tablet by compression by a hand press for measuring. Use the temperature/moisture controller attached to the device to track the transition of the sample under the condition in which the temperature is increased from 30° C. to 90° C. at a temperature rising speed of 2° C./min. at 90% RH followed by a pressure of 100 mN using a standard probe. The peak top in the obtained thermogram is defined as 90% RH thermal distortion temperature and the sample is evaluated.

Measuring of Glass Transition Temperature (Tg)

Device: DSC (Q2000, manufactured by TA instruments)

Fill a sample of 5 mg to 10 mg in a simple aluminum sealed pan for the following measuring flow.

First heating: 30° C. to 220° C., temperature rising speed: 5° C./min., one minute maintained after 220° C.

Cooling down: Quench to −20° C. without temperature control, one minute maintained after −20° C.

Second heating: −20° C. to 180° C., temperature rising speed: 5° C./min.

The glass transition temperature is read by a mid point method in the thermogram in the second heating.

Evaluation of Organic Solvent Solubility

Place 1.5 g of the synthesized resin in each solvent of 8.5 g of three kinds of solvents, which are ethyl acetate, tetrahydrofuran, and toluene, stir the liquid for 24 hours in a 20 ml screw vial, and check whether there is a un-dissolved component by naked eyes. The resin which has been dissolved in all of the three solvents is determined as soluble in organic solvent.

Manufacturing Example C-1

Synthesis of Resin C-A

Place 85.0 parts by weight of L-lactide, 15.0 parts by weight of D-lactide, and 24 parts by weight of cholesterol as an initiator, gradually raise the temperature of the system, and dehydrate it under a reduced pressure. Next, raise the temperature furthermore under purging of $N_2$, confirm the system has become uniform by naked eyes, and place 0.03 parts by weight of tin 2-ethyl hexanoate to conduct polymerization reaction. The temperature in the system is controlled not to be higher than 190° C.

After a two-hour reaction, the system is switched to an outflow line again to remove non-reacted lactide under a reduced pressure environment and complete the polymerization reaction to obtain a resin C-A.

Manufacturing Examples C-2 to C-9

Synthesis of Resin C-B to C-I

The resins C-B to C-I of the Manufacturing Examples C-2 to C-9 are manufactured in the same manner as in Manufacturing Example C-1 except that the kind and the content of the initiator are changed as shown in Table C-1. The Chemical compound P is represented as follows:

TABLE C-1

| Resin | Initiator Kind | Content (parts by weight) | L-lactide Content (parts by weight) | D-lactide Content (parts by weight) |
|---|---|---|---|---|
| Resin C-A | Cholesterol | 24 | 85 | 15 |
| Resin C-B | Mandelic acid | 8.2 | 85 | 15 |
| Resin C-C | Mandelic acid | 4.5 | 85 | 15 |
| Resin C-D | Mandelic acid | 8.2 | 60 | 40 |
| Resin C-E | Mandelic acid | 17.8 | 85 | 15 |
| Resin C-F | 6-hydroxy-1-naphthalene carbonate | 23.2 | 85 | 15 |
| Resin C-G | Salicylic acid | 7.4 | 85 | 15 |
| Resin C-H | 4-fluorophenol | 5.9 | 85 | 15 |
| Resin C-I | Compound P | 9.5 | 85 | 15 |

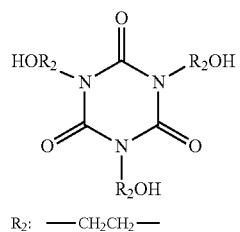

Chemical compound P $R_2$: —$CH_2CH_2$—

Manufacturing Example C-10

Synthesis of Resin C-1

Manufacturing Example C-12

Synthesis of Resin C-3

Place 153 parts by weight of the resin C-B in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 17 parts by weight of isophorone diisocyanate to conduct reaction while maintaining the temperature of the system at 80° C. Thereafter, add 6.7 parts by weight of the Chemical compound P to obtain a Resin C-3.

Manufacturing Example C-13

Synthesis of Resin C-4

Place 268 parts by weight of the resin C-C in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 17 parts by weight of isophorone diisocyanate to conduct reaction while maintaining the temperature of the system at 80° C. Thereafter, add 6.7 parts by weight of the Chemical compound P to obtain a Resin C-4.

Manufacturing Example C-14

Synthesis of Resin C-5

Place 153 parts by weight of the resin C-D in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 17 parts by weight of isophorone diisocyanate to conduct reaction while maintaining the temperature of the system at 80° C. Thereafter, add 6.7 parts by weight of the Chemical compound P to obtain a Resin C-5.

Manufacturing Example C-17

Synthesis of Resin C-8

Place 150 parts by weight of the resin C-G in a flask and gradually raise the temperature of the system. After confirming the system has become uniform by naked eyes, dehydrate the system under a reduced pressure. Thereafter, maintain the temperature of the system at 150° C. and add 13 parts by weight of the Chemical compound S represented by the following chemical structure and 0.20 parts by weight of tin 2-ethylhexonate to conduct reaction to obtain a Resin C-8.

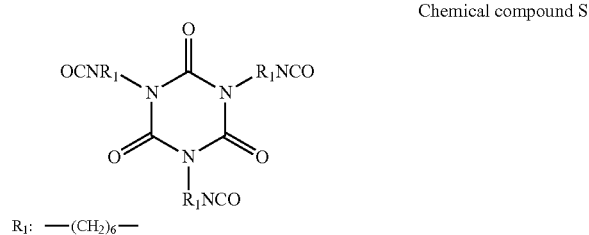

Chemical compound S $R_1$: —$(CH_2)_6$—

Manufacturing Example C-18

Synthesis of Resin C-9

Place 150 parts by weight of the resin C-H in a flask and gradually-raise the temperature of the system. After confirming the system has become uniform by naked eyes, dehydrate the system under a reduced pressure. Thereafter, while maintaining the temperature of the system at 150° C., add 13 parts by weight of Chemical compound 5 and 0.20 parts by weight of tin 2-ethylhexonate to conduct reaction to obtain a Resin C-9.

Manufacturing Example C-19

Synthesis of Resin C-10

Place 153 parts by weight of the Resin C-B in a flask and gradually raise the temperature of the system. After confirming the system has become uniform by naked eyes, dehydrate the system under a reduced pressure. Thereafter, add ethyl acetate to the system to be 50% by weight, 0.20 parts by weight of tin 2-ethylhexonate, and 17 parts by weight of isophorone diisocyanate to conduct reaction while maintaining the temperature of the system at 80° C. Thereafter, add 10 parts by weight of bis(2-hydroxyethyl)terephthalate to obtain a Resin C-10

The properties of the obtained Resins C-3 to C-5, and C-8 to C-10 are as shown in Table C-2.

TABLE C-2

| | Number average molecular weight (Mn) | Glass transition temperature Tg (° C.) | 90% RH thermal distortion (° C.) | Solubility in organic solvent | Optical purity | Urethane bonding contained |
|---|---|---|---|---|---|---|
| Resin C-3 | 6,000 | 59 | 52 | Yes | 70 | Yes |
| Resin C-4 | 10,500 | 53 | 51 | Yes | 70 | Yes |
| Resin C-5 | 6,150 | 57 | 51 | Yes | 70 | Yes |
| Resin C-8 | 5,800 | 55 | 50 | Yes | 70 | Yes |
| Resin C-9 | 6,300 | 58 | 55 | Yes | 70 | Yes |
| Resin C-10 | 6,200 | 60 | 57 | Yes | 70 | Yes |

Examples C-3 to C-5 and C-8 to C-10

Manufacturing of Toners C-3 to C-5 and C-8 to C-10

Preparation of Master Batch C-1

Mix the raw materials shown in Table C-3 and each of the Resins C-3 to C-5 and C-8 to C-10 prescribed shown in Table C-3 by a HENSCHEL MIXER to obtain a mixture in which water penetrates a pigment agglomeration body.

Mix and knead the mixture for 45 minutes by two rolls where the temperature of the surface is set at 130° C. and pulverize the resultant by a pulverizer to the size of 1 mm φ to obtain a Master batch C-1. The resins for use in the Toners C-3 to C-5 and C-8 to C-10 are as shown in Table C-4.

Table C-4

TABLE C-3

| Master batch C-1 composition | |
|---|---|
| Pigment: C.I. Pigment Yellow 185 | 40 parts |
| Resins C-3 to C-5 and C-8 to C-10 | 60 parts |
| Water | 30 parts |

TABLE C-4

| | Toner | Resin |
|---|---|---|
| Example C-3 | Toner C-3 | Resin C-3 |
| Example C-4 | Toner C-4 | Resin C-4 |
| Example C-5 | Toner C-5 | Resin C-5 |
| Example C-8 | Toner C-8 | Resin C-8 |
| Example C-9 | Toner C-9 | Resin C-9 |
| Example C-10 | Toner C-10 | Resin C-10 |

Admix and knead carnauba wax (molecular weight: 1,800, acid value: 2.7 mgKOH/g, penetration degree: 1.7 mm at 40° C.), the master batch C-1, a charge control agent (E-84, manufactured by Orient Chemical Industries Co., Ltd.) prescribed as shown in Table C-5 by a two-axis extruder followed by pulverization and classification to obtain toner particles.

Next, mix 0.5 parts by weight of hydrophobic silica, 0.5 parts by weight of hydrophobized titanium oxide, and 100 parts by weight of the toner particles by a HENSCHEL MIXER to obtain Toners C-3 to C-5 and C-8 to C-10.

TABLE C-5

| Toner composition | |
|---|---|
| Resins C-3 to C-5 and C-8 to C-10 | 90 parts |
| Carnauba wax | 4 parts |
| Master batch C-1 | 5 parts |
| Charge control agent | 1 part |

Examples C-13 and C-15

Manufacturing of Toners C-13 and C-15

Synthesis of Polyester Prepolymer

The following recipe is placed in a container equipped with a condenser, a stirrer, and a nitrogen introducing tube to conduct a reaction at 230° C. for eight hours under normal pressure followed by another reaction for seven hours with a reduced pressure of 10 mmHg to 15 mmHg to obtain an intermediate polyester resin:

Adduct of bisphenol A with 2 mole of ethylene oxide: 720 parts

Adduct of bisphenol A with 2 mole of propylene oxide: 90 parts

Terephthalic acid: 290 parts

Trimellitic anhydride: 25 parts

Dibutyl tin oxide: 2 parts.

The obtained intermediate polyester resin has a number average molecular weight (Mn) of 2,500, and a weight average molecular weight (Mw) of 10,700, a peak molecular weight of 3,400, a glass transition temperature of 57° C., an acid value of 0.4 mgKOH/g, and a hydroxyl value of 49 mgKOH/g.

Next, 400 parts of the Intermediate polyester resin, 95 parts of isophorone diisocyanate, and 580 parts of ethyl acetate are placed in a reaction container equipped with a condenser, stirrer, and a nitrogen introducing tube to conduct reaction at 100° C. for eight hours to prepare a polyester prepolymer.

The obtained polyester prepolymer has a content of an isolated isocyanate of 1.42% by weight.

Preparation of Master Batch C-2

Mix 1,000 parts of water, 530 parts of carbon black (Printex 35 from Degussa AG, which has a dibutyl phthalate (DBP) oil absorption of 42 ml/100 g and has a PH of 9.5), and 1,200 parts of the each of the Resins C-3 and C-8 (refer to Table C-6) by a HENSCHEL MIXER (manufactured by Nippon Coke & Engineering Co., Ltd.).

Mix and knead the mixture at 150° C. for 30 minutes using a two-roll mill followed by rolling and cooling down. Thereafter, pulverize the kneaded mixture by a pulverizer (manufactured by Hosokawa Micron Group) to prepare a Master batch C-2.

Synthesis of Ketimine Compound

Place 30 parts of isophorone diamine and 70 parts of methyl ethyl ketone in a reaction container equipped with a stirrer and a thermometer to conduct reaction at 50° C. for five hours to obtain a Ketimine compound.

The obtained ketimine has an amine value of 423 mgKOH/g.

Preparation of Liquid Dispersion C of Resin Particulate

The following recipe is placed in a container equipped with a stirrer and a thermometer and stirred at 400 rpm for 20 minutes to obtain a white emulsion:

Water: 600 parts

Styrene: 120 parts

Methacrylic acid: 100 parts

Butyl acrylate: 45 parts

Alkyl aryl sodium sulfosuccinate (EREMINOR JS-2, manufactured by Sanyo Chemical Industries, Ltd.): 10 parts Ammonium persulfate: 1 part.

Heat the system to 75° C. to continue the reaction for six hours.

Add 30 parts of aqueous solution of 1% ammonium persulfate thereto and age the resultant at 75° C. for six hours to obtain a liquid dispersion C of particulate (i.e., an aqueous liquid solution) of a vinyl resin (copolymer of styrene-metahcrylic acid-butyl methacrylate-alkyl aryl sodium sulfosuccinate).

The volume average particle diameter of the liquid dispersion C of particulate measured by ELS-800 is 0.08 μm.

Isolate the resin portion by drying part of the liquid dispersion C of particulate. The glass transition temperature of the resin portion is 74° C. by a flow tester measuring.

Preparation of Aqueous Medium

Prepare an aqueous medium by uniformly dissolving 300 parts of dodecyl benzene sodium sulfonate and 0.2 parts of the liquid dispersion C of particulate in 300 parts of deionized water by mixing and stirring.

Preparation of Resin Solution

Add and stir 80 parts of the each of the Resins and the polyester prepolymer prescribed shown in Table C-6 and 80 parts of ethylacetate in a reaction container to obtain resin solutions C-3 and C-5.

TABLE C-6

|  |  |  | Resin | | Prepolymer |
|---|---|---|---|---|---|
|  |  |  | Kind | Parts | Parts |
| Example C-13 | Toner C-13 | Resin Solution C-3 | Resin C-3 | 100 | 0 |
| Example C-15 | Toner C-15 | Resin Solution C-5 | Resin C-8 | 85 | 15 |

Preparation of Oil Phase

Place 5 parts of carnauba wax (molecular weight: 1,800, acid value: 2.7 mgKOH/g, penetration level: 1.7 mm at 40° C.) and 5 parts of the master batch B in each of the resin solutions C-3 and C-5) and the resultant is dispersed using a bead mill (ULTRAVISCOMILL from AIMEX) under the following conditions to obtain Oil phases C-3 and C-5:

Liquid feeding speed: 1 kg/hr

Disc rotation speed: 6 m/sec

Diameter of zirconia beads: 0.5 mm

Filling factor: 80% by volume

Number of dispersion treatment: 3 times.

Furthermore, with regard to the Oil phase C-5, add and dissolve 2.5 parts of the ketimine compound in the resultant to obtain an oil phase.

Preparation of Toner

Place 150 parts of the aqueous medium phase in another reaction container and admix 100 parts of each of the Oil phase C-3 to and C-5 thereto while stirring by a T.K. Homomixer (manufactured by Tokushu Kika Kogyo Co., Ltd.) at 12,000 rpm by for ten minutes to obtain an emulsified slurry. Furthermore, place 100 parts of the emulsified slurry in a flask equipped with a stirrer and a thermometer and remove the solvent at 30° C. for ten hours while stirring at a stirring peripheral speed of 20 m/min. to obtain a Dispersed slurry C.

After filtrating 100 parts of the Dispersed slurry C with a reduced pressure, add 100 parts of deionized water to the obtained filtered cake followed by mixing by a TK Homomixer at 12,000 rpm for ten minutes and thereafter filtration.

After adding 300 parts of deionized water to the obtained filtered cake, mix the resultant by a TK Homomixer at 12,000 rpm for ten minutes. This filtration is repeated twice. Admix 10 parts of aqueous solution of 10% by weight of sodium hydroxide to the obtained filtered cake using a TK Homomixer at 12,000 rpm for 30 minutes followed by filtration with a reduced pressure.

After adding 300 parts of deionized water to the obtained filtered cake, mix the resultant by a TK Homomixer at 12,000 rpm for ten minutes. This filtration is repeated twice. Admix 20 parts of 10% by weight hydrochloric acid to the obtained filtered cake by a TK Homomixer at 12,000 rpm for ten minutes and add fluorinated quaternary ammonium chloride (FUTARGENT F-310, manufactured by Neos Company Limited) by 5% methanol solution to the mixture in such a manner that the fluorinated quaternary ammonium chloride is 0.1 parts to 100 parts of the solid portion of toner followed by a ten minute stirring and thereafter filtration.

After adding 300 parts of deionized water to the obtained filtered cake, mix the resultant by a TK Homomixer at 12,000 rpm for ten minutes. This filtration is repeated twice to obtain a filtered cake. Dry the obtained filtered cake at 40° C. for 36 hours using a circulation dryer followed by screening with a mesh having an opening of 75 μm to manufacture Mother toner particles C-13 to and C-15.

Repeat mixing 1.0 parts of a hydrophobic silica (H2000, manufactured by Clariant Japan K.K.) serving as an external additive and 100 parts of each of the obtained Mother toner particles C-13 and C-15 using a HENSCHEL MIXER (manufactured by Nippon Coke & Engineering Co., Ltd.) at a peripheral speed of 30 m/sec. for 30 seconds followed by a one-minute rest five times. Screen the resultant with a mesh having an opening of 35 μm to manufacture Toners C-13 and C-15.

The structures of the resin for toner for used in the Toners of Examples C-3 to C-5, C-8 to C-10, C-13, and C-15 are shown in Table C-7.

The structures of the resin for toner for used in the Toners of Examples C-1 to C-15 are shown in Table C-7.

Manufacturing of Development Agent

Mix 5 parts of each of the Toner C-3 to C-5, C-8 to C-10, C-13 and C-15 and 95 parts of the Carrier C to manufacture development agents of Examples C-3 to C-5, C-8 to C-10, C-13 and C-15.

Next, the obtained development agents are evaluated with regard to the fixing property, the high temperature preservation property, the charge environment variance, and the haze degree according to the evaluation methods and criteria described later. The evaluation results are shown in Tables E-1 and E-2.

Manufacturing of Carrier D-1

Disperse the following recipe by a Homomixer for ten minutes to prepare a liquid application for blended covering layer of an acrylic resin containing aluminum particles and silicone resins.

Composition of Liquid Application for Covering Layer

Acrylic resin solution (Solid portion: 50% by weight): 21.0 parts

Guanamine solution (Solid portion: 70% by weight): 6.4 parts

Aluminum particles as particulates (0.3 μm, specific resistance: $10^{14}$ (Ω·cm): 7.6 parts

TABLE C-7

| | Toner | Resin C-A to C-I | Resin C-3 to C-10 |
|---|---|---|---|
| Example C-3 | Toner C-3 | Resin C-B | Resin C-3 |
| Example C-4 | Toner C-4 | Resin C-C | Resin C-4 |
| Example C-5 | Toner C-5 | Resin C-D | Resin C-5 |
| Example C-8 | Toner C-8 | Resin C-G | Resin C-8 |
| Example C-9 | Toner C-9 | Resin C-H | Resin C-9 |
| Example C-10 | Toner C-10 | Resin C-B | Resin C-10 |
| Example C-13 | Toner C-13 | Resin C-B | Resin C-3 |
| Example C-15 | Toner C-15 | Resin C-G | Resin C-8 |

| | Structure of resin | | | | Polar group | |
|---|---|---|---|---|---|---|
| | X | Y | Z | n | Bonding position | Functional group |
| Example C-3 | Compound P | PLA | Mandelic acid | 3 | Z | —COOH |
| Example C-4 | Compound P | PLA | Mandelic acid | 3 | Z | —COOH |
| Example C-5 | Compound P | PLA | Mandelic acid | 3 | Z | —COOH |
| Example C-8 | Compound S | PLA | Salicylic acid | 3 | Z | —COOH |
| Example C-9 | Compound S | PLA | 4-fluorophenol | 3 | Z | —F |
| Example C-10 | Bis (2-hydroxyethyl) terephthalate | PLA | Mandelic acid | 2 | Z | —COOH |
| Example C-13 | Compound P | PLA | Mandelic acid | 3 | Z | —COOH |
| Example C-15 | Compound S | PLA | Salicylic acid | 3 | Z | —COOH |

Manufacturing of Carrier C

The following recipe is added to 100 parts of toluene followed by dispersion by a Homomixer for 20 minutes to prepare a liquid application of a resin layer.

Silicone resin (Organostraight silicone): 100 parts
γ-(2-aminoethyl)amino propyl trimethoxy silane: 5 parts
Carbon black: 10 parts Apply the liquid application of a resin layer to the surface of 1,000 parts of spherical magnetite having a volume average particle diameter of 50 μm using a fluid bed type coating device to manufacture a Carrier C.

Silicone resin solution (Solid portion: 23% by weight, SR2410, manufactured by Dow Corning Toray Silicone Co., Ltd.): 65.0 parts Amino silane (Solid portion: 100% by weight, SH16020, manufactured by Dow Corning Toray Silicone Co., Ltd.): 0.3 parts Toluene: 60 parts Butyl cellosolve: 60 parts Next, use baked ferrite powder [$(MgO)_{1.8}(MnO)_{49.5}(Fe_2O_3)_{48.0}$; Average particle diameter: 35 μm)] as a core material. Apply the liquid application for the covering layer to the surface of the core material by SPIRA COTA (manufactured by Okada Seiko Co., Ltd.) to obtain a layer having a thickness of 0.15 μm followed by drying. Leave and bake the obtained carrier in an electric furnace at 150° C. for an hour. Subsequent to cooling down, pulverize the carrier using a sieve having an opening of 106 μm to obtain Carrier D-1. The Carrier D-1 has a static resistance of 11.5 log·Ωcm.

Since the thickness of the covering layer is measured by observing the cross section of the carrier by a transmission electron microscope (TEM) to observe the covering layer covering the surface of the carrier, the average of the thickness is defined as the thickness of the covering layer.

Manufacturing Example D-1

Manufacturing of Resin D-1

Place 170 g of L-lactide, 30 g of D-lactide, and 6.8 g of cholesterol (1.4 mol %, 100 mol % against lactide), gradually raise the temperature of the system to 150° C., and thereafter dehydrate it under a reduced pressure of 10 mmHg for 30 minutes. Next, raise the temperature to 170° C. under purging of $N_2$, confirm the system has become uniform by naked eyes, and place 50 mg of tin 2-ethyl hexanoate to conduct polymerization reaction. The temperature in the system is controlled not to be higher than 190° C. After a two-hour reaction, the system is switched to an outflow line again to remove non-reacted lactide at 190° C. under a reduced pressure of 10 mmHg and complete the polymerization reaction to obtain a polylactate resin (Resin D-1). The properties of the Resin D-1 are as shown in Table D-1.

Manufacturing Example D-2

Manufacturing of Resin D-2

A polylactate resin (Resin D-2) is manufactured in the same manner as the Resin D-1 except that the content of cholesterol is changed from 1.4 mol % to 0.7 mol %. The properties of the Resin D-2 are as shown in Table D-1.

Manufacturing Example D-3

Manufacturing of Resin D-3

A polylactate resin (Resin D-3) is manufactured in the same manner as the Resin D-1 except that the content of cholesterol is changed from 1.4 mol % to 0.35 mol %. The properties of the Resin D-3 are as shown in Table D-1.

Manufacturing Example D-4

Manufacturing of Resin D-4

Place the polylactide resin having cholesterol in the main chain, which is obtained in the manufacturing of the Resin D-1 in a flask and dissolve it in an ethyl acetate solution to prepare a 50% by weight solution. Heat and reflux the solution in an oil bath at 90° C. and add isophorone diisocyanate (50 mol % based on 100 mol % of the polylactide resin) thereto and then tin 2-ethylhexonate in an amount of 200 ppm based on the resin mass to conduct reaction for two hours. Thereafter, remove the solvent by using vacuum dryer to obtain a Resin D-4 as the casting layer. The properties of the Resin D-4 are as shown in Table D-1.

Manufacturing of Toner D-1

Dissolve 100 parts of the Resin D-1, 4 parts of Carbon black (MOGUL L, manufactured by Cabot Corporation), 1 part of a negative charge controlling agent (BONTRON S-34, manufactured by Orient Chemical Industries Co., Ltd.), and 1 part of polypropylene wax (NP-105, manufactured by Mitsui Chemicals, Incorporated) in 110 parts of ethyl acetate followed by dispersion by a bead mill (ULTRAVISCOMILL from AIMEX) to prepare a resin solution.

Place this solution in a liquid mixture of 200 parts of water, 4 parts of dodecyl benzene sodium sulfonate (MON-7, manufactured by Sanyo Chemical Industries, Ltd.), and 20 parts of ethyl acetate followed by mixing by a TK Homomixer (manufactured by Tokushu Kika Kogyo Co., Ltd.) at 13,000 rpm for two minutes to obtain an aqueous medium liquid dispersion. Thereafter, remove the solvent therefrom at 30° C. for eight hours. Repeat dispersion and washing by filtration three times to wash the surface of obtained particles followed by filtration. Dry the resultant at 45° C. for 48 hours and filter it by a screen having an opening of 75 μm to obtain Mother toner particles.

Add 1.0 parts of AEROSIL® R-972 (manufactured by Nippon Aerosil Co., Ltd.) to 100 parts of the Mother toner particles followed by mixing by a HENSCHEL MIXER to obtain Toner D-1. The Toner D-1 has a volume average particle diameter (Dv) of 6.2 μm, Dv/Dn (number average particle diameter) of 1.1, a softening point of 52° C., and a glass transition temperature of 50° C.

Manufacturing of Toner D-2

Toner D-2 is manufactured in the same manner as Toner D-1 except that the Resin D-2 is used instead of the Resin D-1.

The Toner D-2 has a volume average particle diameter (Dv) of 6.2 μm, Dv/Dn (number average particle diameter) of 1.1, a softening point of 66° C., and a glass transition temperature of 65° C.

Manufacturing of Toner D-3

Toner D-3 is manufactured in the same manner as Toner D-1 except that the Resin D-3 is used instead of the Resin D-1.

The Toner D-3 has a volume average particle diameter (Dv) of 6.1 μm, Dv/Dn (number average particle diameter) of 1.2, a softening point of 69° C., and a glass transition temperature of 67° C.

Manufacturing of Toner D-4

Toner D-4 is manufactured in the same manner as Toner D-1 except that the Resin D-4 is used instead of the Resin D-1.

The Toner D-4 has a volume average particle diameter (Dv) of 6.1 μm, Dv/Dn (number average particle diameter) of 1.1, a softening point of 69° C., and a glass transition temperature of 68° C.

The Toners D-1 to D-4 and the Resins D-1 to D-4 are shown in Table D-1. Solubility in organic solvent (ethyl acetate) in Table D-1 is evaluated as follows: G: Good B: Bad.

TABLE D-1

| | | Resin synthesis condition | | | |
|---|---|---|---|---|---|
| Resin | Toner | Lactide of L-lactide (parts by weight) | Lactide of D-lactide (parts by weight) | Kind of Initiator | Content of initiator (mol %) |
| Resin D-1 | Toner D-1 | 85 | 15 | Cholesterol | 1.4 |
| Resin D-2 | Toner D-2 | 85 | 15 | Cholesterol | 0.7 |

TABLE D-1-continued

| Resin | Toner | | | | |
|---|---|---|---|---|---|
| Resin D-3 | Toner D-3 | 85 | 15 | Cholesterol | 0.35 |
| Resin D-4 | Toner D-4 | 85 | 15 | Cholesterol | 1.4 |

| Resin | Molecular weight of polylactide resin | Glass transition temperature Tg of resin (° C.) | Solubility in organic solvent (ethyl acetate) |
|---|---|---|---|
| Resin D-1 | 10,000 | 48 | Good |
| Resin D-2 | 20,000 | 52 | Good |
| Resin D-3 | 40,000 | 55 | Good |
| Resin D-4 | 20,000 | 55 | Good |

Manufacturing of Two Component Development Agent

Stir 5 parts of Toner and 95 parts of Carrier D-1 in combination shown in Table D-2 by a tubular mixer (T2F, manufactured by Willy A. Bachofen AG) for five minutes to manufacture two component development agents of Examples D-1 to D-4.

TABLE D-2

| | Toner | Carrier |
|---|---|---|
| Example D-1 | Carrier D-1 | Toner 1 |
| Example D-2 | Carrier D-1 | Toner 2 |
| Example D-3 | Carrier D-1 | Toner 3 |
| Example D-4 | Carrier D-1 | Toner 4 |

Evaluation Methods and Criteria

Fixing Property

Form solid images on plain paper (Transfer paper type 6200, manufactured by Ricoh Co., Ltd.) and thick paper (Photocopying printing paper <135>, manufactured by NBS Ricoh Co., Ltd.) with an amount of attached toner of from 0.75 to 0.95 mg/cm$^2$ using a photocopier in which the fixing unit is remodeled based on an electrophotographic photocopier (MF-200, manufactured by Ricoh Co., Ltd.) using a Teflon® roller as the fixing roller.

The allowable lowest fixing temperature is defined to be a temperature below which the remaining ratio of a fixed image density is less than 70% after the fixed image is rubbed by a pad. Evaluations A to C are good.

Evaluation Criteria on Allowable Lowest Fixing Temperature

A: lower than 125° C.

B: 125° C. to lower than 130° C.

C: 130° C. to lower than 140° C.

D: 140° C. or higher

Evaluation Criteria on Fixing Latitude (Range)

A: 60° C. or wider

B: 40° C. to less than 60° C.

C: 20° C. to less than 40° C.

D: narrower than 20° C.

High Temperature Preservation Property

Place 4 g of toner into a non-sealed type cylinder container having a diameter of 5 cm and a height of 2 cm and leave it in an environment of 45° C. and a relative humidity of 65% for 72 hours. Thereafter, shake lightly the container containing the toner and observe the agglomeration of the toner by naked eyes.

The high temperature preservation property of the toner is evaluated according to the following evaluation criteria. Evaluations A to C are good.

Evaluation Criteria on High Temperature Preservation Property

A: No agglomeration observed

B: One to two agglomerated particles observed

C: Three to Five agglomerated particles observed

D: Six or more agglomerated particles observed

Charge Environment Variance

Stir the obtained development agent at 23° C. and relative humidity of 50% (M/M environment) by a ball mill for five minutes. Take 1.0 g of the development agent and measure the amount of charge by a blow-off charge measuring device (TB-200, manufactured by KYOCERA Chemical Corporation) after blowing nitrogen for one minute. In addition, conduct this measurement at 40° C. and relative humidity of 90% (H/H environment) and 10° C. and relative humidity of 30% (L/L environment) to evaluate the amount of charge of each development agent. Based on the thus-obtained amount of charge, calculate the charge environment variance ratio using the following relationship A. Evaluate the environment variance ratio according to the following evaluation criteria. In terms of stability of charge, the lower the environment variance ratio, the better the development agent. Evaluations A to C are determined as good.

Environment variance ratio=2×{(L/L)−(H/H))/(L/L)+(H/H)}×100(%)  Relationship A

Evaluation Criteria on Charge Environment Variance

A: Environment variance ratio: less than 40%

B: Environment variance ratio: 40% to less than 50%

C: Environment variance ratio: 50% to less than 60%

D: Environment variance ratio: 60% or higher

Haze Degree

Develop a single color sample image (a solid image having an amount of toner attachment of from 0.84 to 0.86 mg/cm2 on a transparent sheet) for the fixing evaluation on a transparent sheet (type PPC-DX, manufactured by Ricoh Co., Ltd.) and measure the haze degree of the image by a direct-reading haze degree computer (HG←2DP, manufactured by Suga Test Instruments Co., Ltd.).

Evaluate the obtained haze degree according to the following evaluation criteria. Haze degree is also referred to as opaque degree, which indicates the transparency of the toner. The lower the value, the higher the transparency. That is, the chromic property of the toner a transparent sheet is good when the value is low. Evaluations A to C are determined as good.

Evaluation Criteria on Haze Degree

A: Haze degree: less than 20%

B: Haze degree: 20% to less than 25%

C: Haze degree: 25% to less than 30%

D: Haze degree: 30% or higher

The evaluation results of Examples and Comparative Examples are shown in Tables E-1 and E-2.

TABLE E-1

| | Fixing property | | |
|---|---|---|---|
| | Allowable lowest fixing temperature | Fixing latitude (range) | High temperature preservation property |
| Example A-1 | B | C | A |
| Example A-2 | A | B | A |
| Example A-3 | B | A | B |
| Example A-4 | A | B | B |
| Example A-5 | B | B | B |
| Example A-6 | B | B | B |
| Example A-7 | A | B | B |
| Example A-8 | B | B | A |
| Example A-9 | B | B | A |
| Example A-10 | B | B | A |
| Example A-11 | A | C | A |

TABLE E-1-continued

| | Fixing property | | |
|---|---|---|---|
| | Allowable lowest fixing temperature | Fixing latitude (range) | High temperature preservation property |
| Example A-12 | B | C | A |
| Example A-13 | A | C | A |
| Example A-14 | A | B | A |
| Example A-15 | B | A | B |
| Example A-16 | A | C | A |
| Example A-17 | B | B | A |
| Example A-18 | B | A | B |
| Example A-19 | A | C | A |
| Example A-20 | B | B | A |
| Example A-21 | B | A | B |
| Comparative Example A-1 | B | B | D |
| Comparative Example A-2 | B | B | D |
| Example B-1 | B | B | C |
| Example B-3 | B | A | B |
| Example B-4 | B | B | B |
| Example B-5 | B | B | A |
| Example B-6 | B | B | B |
| Example B-7 | B | B | A |
| Example B-9 | B | B | B |
| Example C-3 | A | C | A |
| Example C-4 | A | B | B |
| Example C-5 | A | C | A |
| Example C-8 | A | B | B |
| Example C-9 | B | A | A |
| Example C-10 | B | A | A |
| Example C-13 | B | B | A |
| Example C-15 | B | B | A |
| Example D-1 | B | B | A |
| Example D-2 | B | B | A |
| Example D-3 | C | B | B |
| Example D-4 | C | B | A |

TABLE E-2

| | Charge environment variance | Haze degree |
|---|---|---|
| Example C-3 | B | A |
| Example C-4 | B | A |
| Example C-5 | B | A |
| Example C-8 | B | A |
| Example C-9 | A | B |
| Example C-10 | A | B |
| Example C-13 | A | A |
| Example C-15 | A | A |

The invention claimed is:

1. A resin for toner comprising:
a polyhydroxycarboxylic acid skeleton represented by the following chemical formula 1:

$$X—(Y—Z)_n \quad \text{chemical formula 1}$$

where X and Z independently represent rigid skeletons having a planar structure, Y represents a polyhydroxycarboxylic acid structure, and n represents an integer of 2 or greater, wherein the resin is soluble in an organic solvent, and
wherein one of X and Z in chemical formula 1 comprises a polar functional group.

2. The resin for toner according to claim 1, wherein the resin has a glass transition temperature of 50° C. or higher and a softening point of 120° C. or lower as measured by a ½ method using a flow tester.

3. The resin for toner according to claim 1, wherein X in chemical formula 1 comprises a skeleton having an aromatic or heterocyclic ring.

4. The resin for toner according to claim 1, wherein X in chemical formula 1 comprises an isocyanurate skeleton.

5. The resin for toner according to claim 1, wherein Y in chemical formula 1 comprises a urethane bonding.

6. The resin for toner according to claim 1 having a glass transition temperature of 57° C. or higher and a thermal distortion temperature of 53° C. or higher in a compression test at 90% RH.

7. The resin for toner according to claim 1, wherein Z in chemical formula 1 comprises a cyclic compound having a fluorine atom.

8. The resin for toner according to claim 1, wherein the polar functional group is an acid polar functional group.

9. The resin for toner according to claim 8, wherein the acid polar functional group is a carboxyl group, a sulfo group, or a salt of the carboxyl group or the sulfo group.

10. The resin for toner according to claim 1, wherein the polyhydroxycarboxylic acid skeleton is formed by polymerizing hydroxycarboxylic acids having two or three carbon atoms.

11. The resin for toner according to claim 1, wherein the polyhydroxycarboxylic acid skeleton comprises an optically-active monomer,
wherein an optical purity X (%)=|X(L-)−X(D-)| is 80% or less in the optically-active monomer component conversion,
where X (L-) represents the proportion of L- and X (D-) represents the proportion of D- in the optically-active monomer component conversion.

12. The resin for toner according to claim 1, wherein the polyhydroxycarboxylic acid skeleton has a number average molecular weight Mn of from 1,000 to 20,000.

13. A toner comprising:
the resin for toner of claim 1.

14. A development agent comprising:
the toner of claim 13; and
a carrier.

* * * * *